(12) United States Patent
Venkatesan et al.

(10) Patent No.: US 10,694,499 B2
(45) Date of Patent: Jun. 23, 2020

(54) LOCATION ESTIMATION USING MULTI-USER MULTIPLE INPUT MULTIPLE OUTPUT IN A WIRELESS LOCAL AREA NETWORK

(71) Applicant: Intel IP Corporation, Santa Clara, CA (US)

(72) Inventors: Ganesh Venkatesan, Hillsboro, OR (US); Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 345 days.

(21) Appl. No.: 15/636,295

(22) Filed: Jun. 28, 2017

(65) Prior Publication Data
US 2018/0041990 A1 Feb. 8, 2018

Related U.S. Application Data

(60) Provisional application No. 62/372,162, filed on Aug. 8, 2016.

(51) Int. Cl.
*H04W 72/04* (2009.01)
*H04B 7/0452* (2017.01)
(Continued)

(52) U.S. Cl.
CPC .............. *H04W 72/04* (2013.01); *G01S 5/00* (2013.01); *G01S 5/0205* (2013.01); *G01S 5/14* (2013.01);
(Continued)

(58) Field of Classification Search
CPC . H04B 7/0667; H04L 5/0055; H04L 27/2601; H04W 4/023; H04W 40/02; H04W 52/0216; H04W 52/0254; H04W 64/00; H04W 84/12; H04W 88/02; G01S 5/10; G01S 5/14; G01S 5/0226;
(Continued)

(56) References Cited

U.S. PATENT DOCUMENTS

2015/0365805 A1* 12/2015 Bajko et al.
2016/0143026 A1* 5/2016 Seok

\* cited by examiner

*Primary Examiner* — Marsha D Banks Harold
*Assistant Examiner* — Dharmesh J Patel
(74) *Attorney, Agent, or Firm* — Schwegman Lundberg & Woessner, P.A.

(57) ABSTRACT

Computer readable media, methods, and apparatuses for location estimation using multi-user multiple-input multiple-output in a wireless local-area network are disclosed. An apparatus is disclosed comprising processing circuitry configure to: encode a fine timing measurement (FTM) initiate (FTI) frame, the FTI frame comprising M0 message uplink resource allocations for a plurality of responders to transmit M0 messages to the HE STA. The processing circuitry further configured to configure the HE STA to transmit the FTI frame to the plurality of responders, and decode M0 messages from the plurality of responders in accordance with the M0 message uplink resource allocations, where the M0 messages are to be received at the HE STA at times T2 in accordance with multi-user multiple-input multiple-output (MU-MIMO). The processing circuitry further configured to acknowledge the M0 messages to be transmitted at a time T3, and decode M1 messages comprising a corresponding time T1 and time T4.

24 Claims, 16 Drawing Sheets

(51) Int. Cl.
*H04L 5/00* (2006.01)
*G01S 5/00* (2006.01)
*H04B 7/06* (2006.01)
*H04B 7/0417* (2017.01)
*G01S 5/02* (2010.01)
*G01S 5/14* (2006.01)
*H04W 84/12* (2009.01)
*H04W 88/08* (2009.01)
*H04W 64/00* (2009.01)

(52) U.S. Cl.
CPC ......... *H04B 7/0417* (2013.01); *H04B 7/0452* (2013.01); *H04B 7/0619* (2013.01); *H04L 5/0055* (2013.01); *H04L 5/0007* (2013.01); *H04W 64/00* (2013.01); *H04W 84/12* (2013.01); *H04W 88/08* (2013.01)

(58) Field of Classification Search
CPC ..... G01S 5/0242; G01S 5/0289; Y02D 70/00; Y02D 70/142; Y02D 70/144; Y02D 70/164
See application file for complete search history.

LOCATION ESTIMATION USING MULTI-USER MULTIPLE INPUT MULTIPLE OUTPUT IN A WIRELESS LOCAL AREA NETWORK

PRIORITY CLAIM

This application claims the benefit of priority under 35 USC 119(e) to U.S. Provisional Patent Application Ser. No. 62/372,162, filed Aug. 8, 2016, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for location estimation using multiple-user multiple-input multiple-output (MU-MIMO) in a wireless local-area network (WLAN).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limited by the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
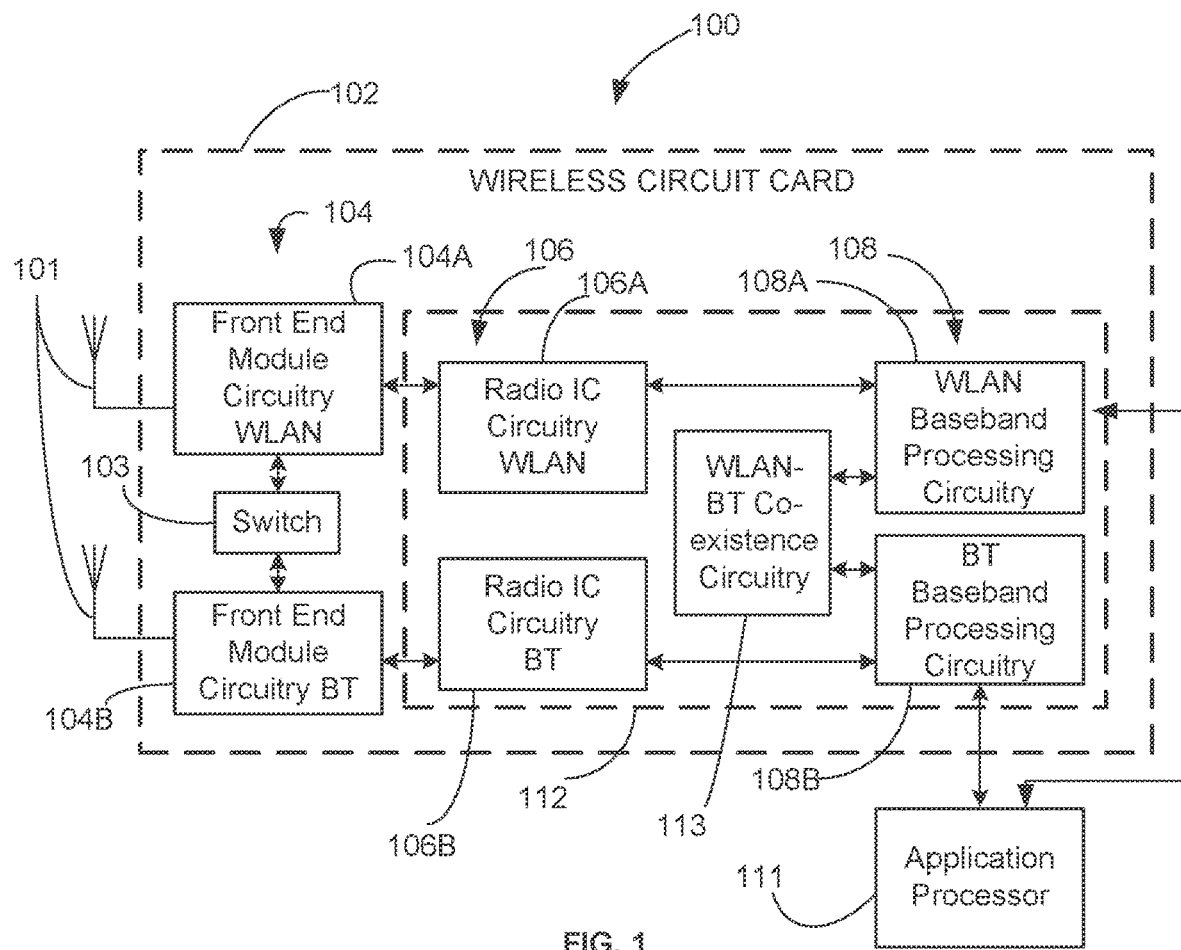
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
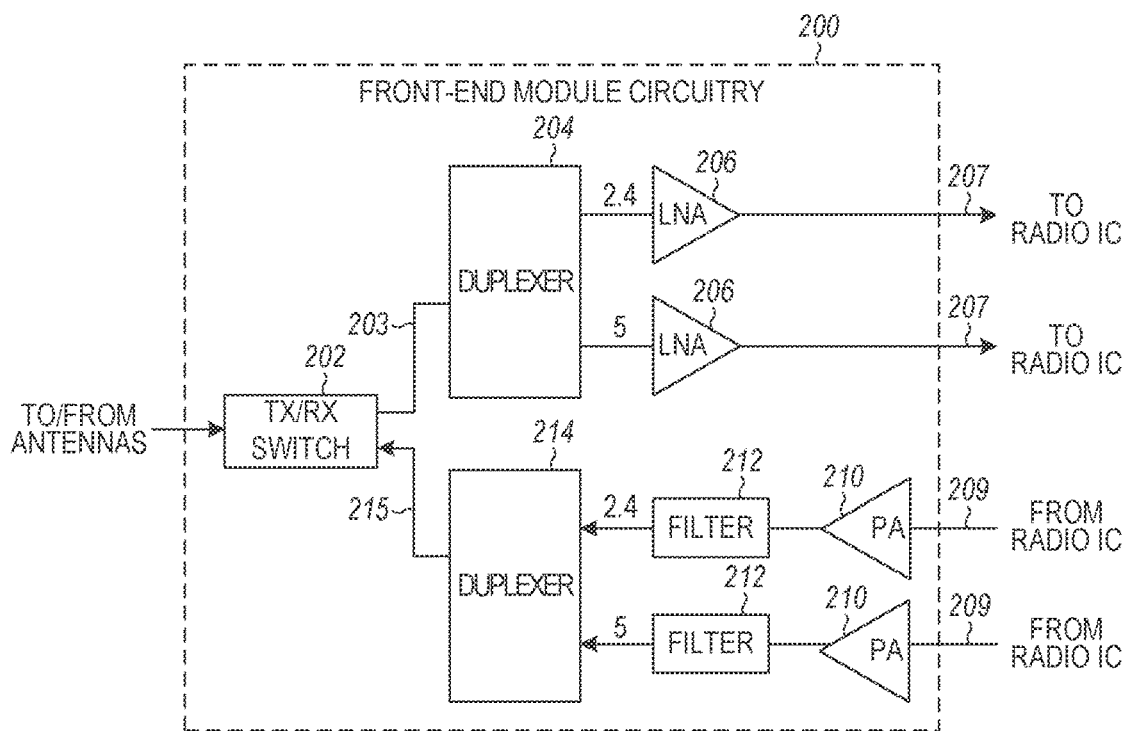
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g. by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
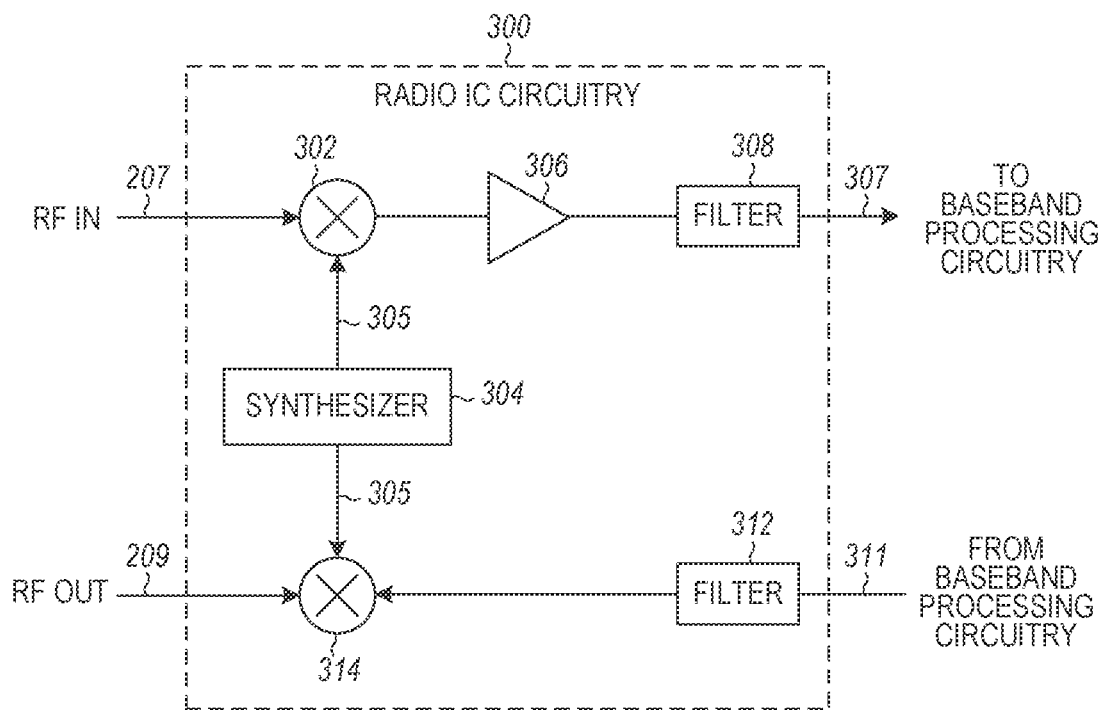
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
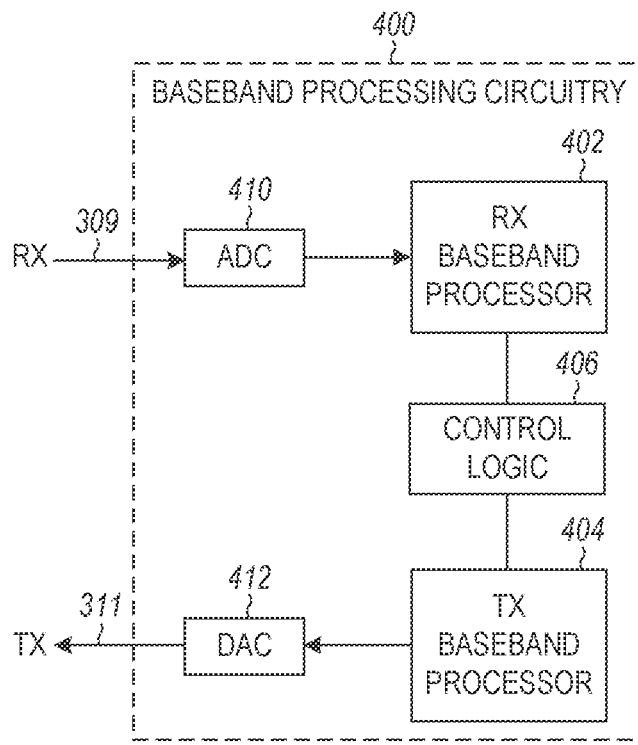
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
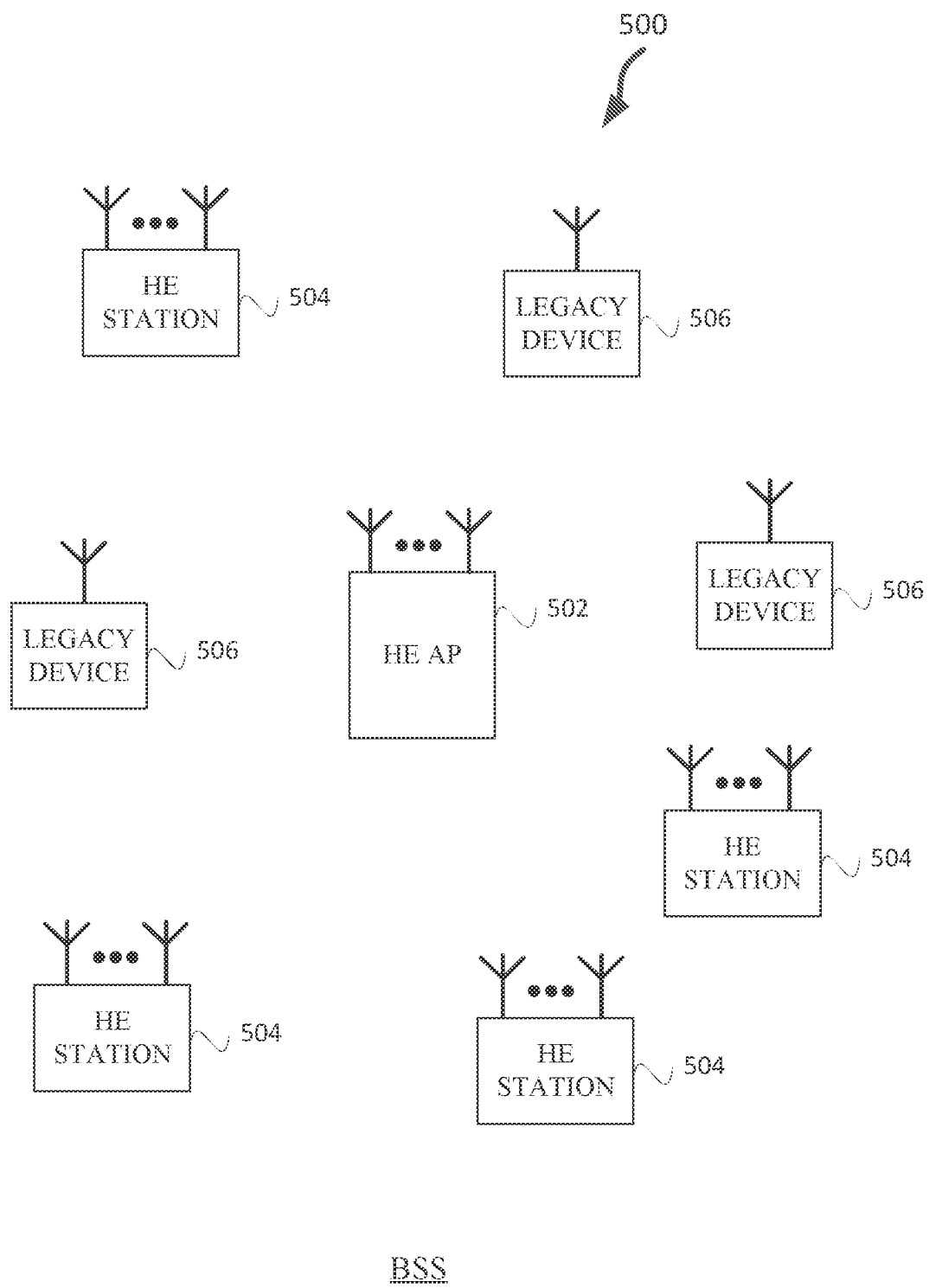
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 236 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-sub-carrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-19.

In example embodiments, the HE station 504 and/or the HE AP 502 are configured to perform the methods and operations/functions described herein in conjunction with FIGS. 1-19. In example embodiments, an apparatus of the HE station 504 and/or an apparatus of the HE AP 502 are configured to perform the methods and functions described herein in conjunction with FIGS. 1-19. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
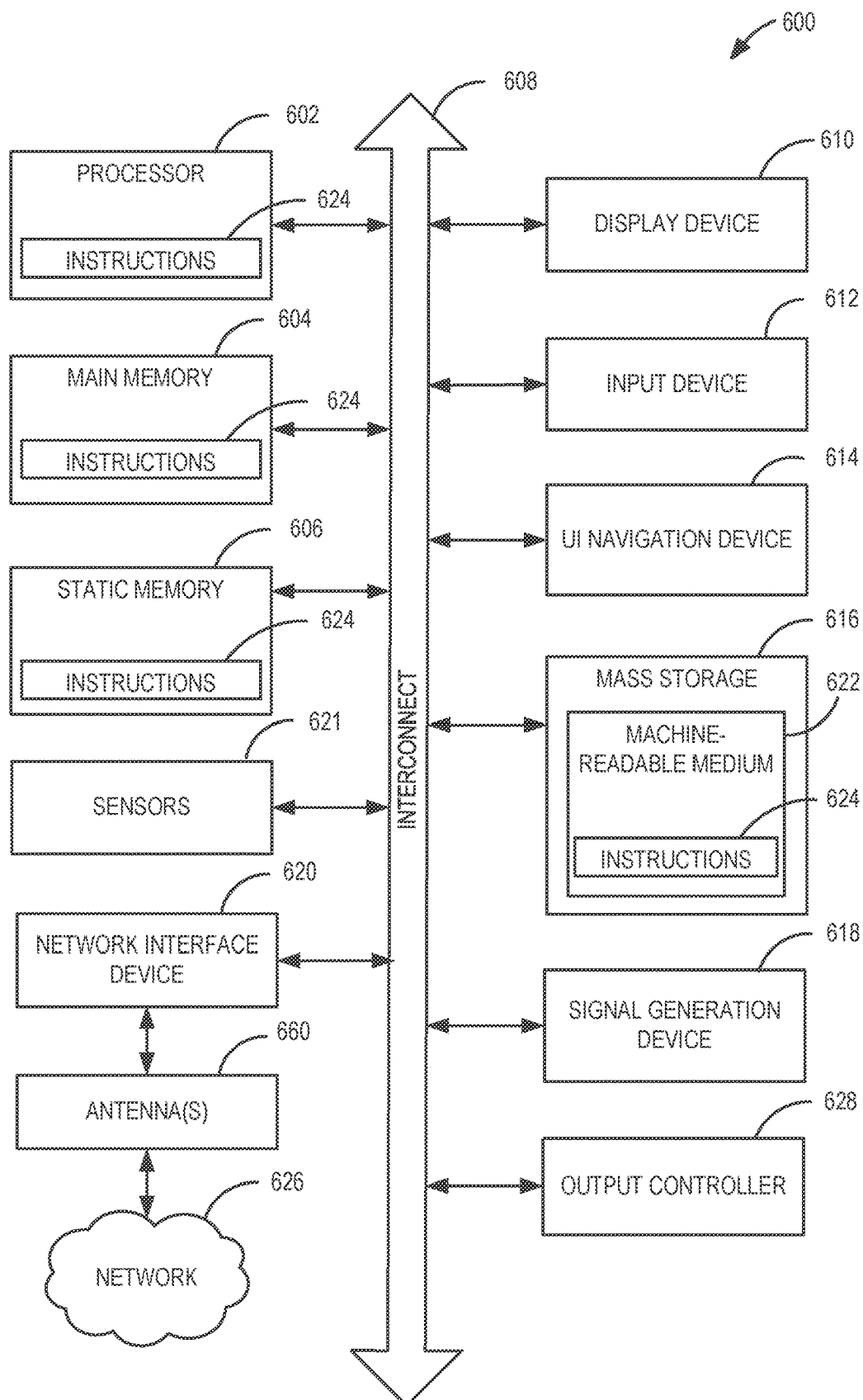
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
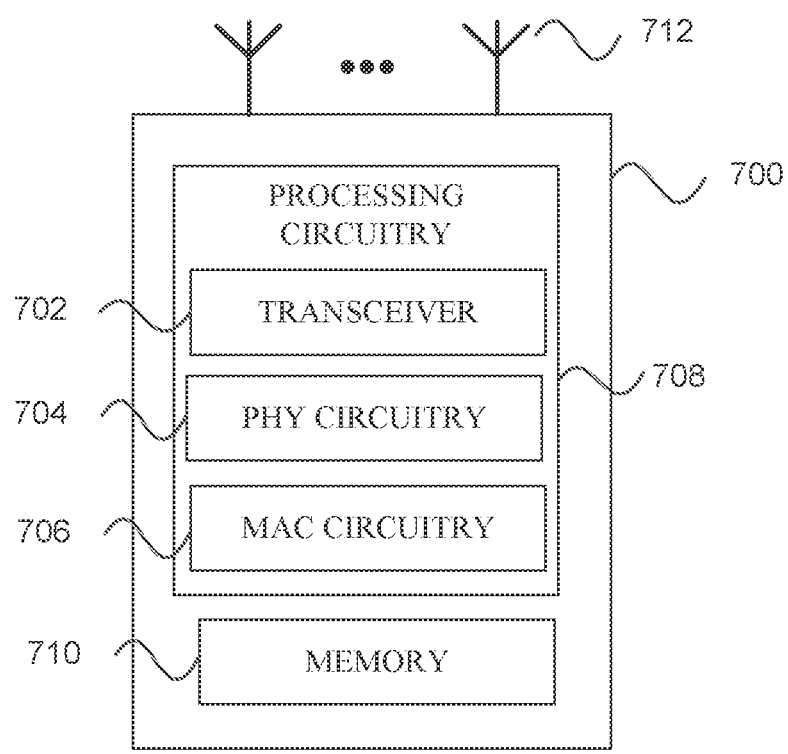
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry. (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704 the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments, the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
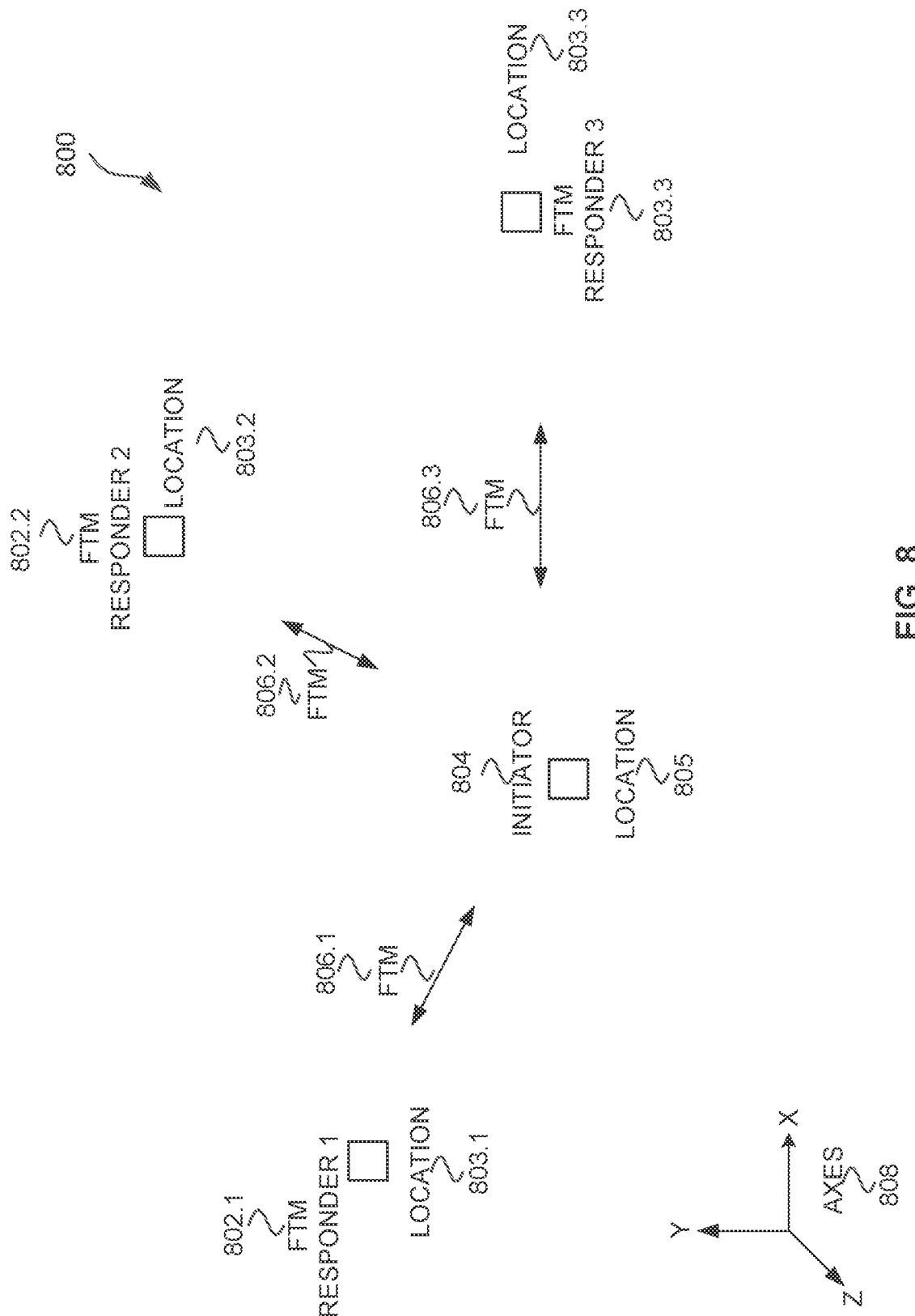
FIG. 8 illustrates the operation of location estimation using MU-MIMO in a WLAN in accordance with some embodiments.

FIG. 8 illustrates the operation 800 of location estimation using MU-MIMO in a WLAN in accordance with some embodiments. Illustrated in FIG. 8 is initiator 804, FTM responder 1 802.1, FTM responder 2 802.2, ELM responder 802.3, and FTMs 806, and axes 808. The initiator 804 may be a HE STA 504 and/or a HE AP 502. FTM responders 802 may be HE STAs 504 and/or HE AP 502. FTM 806 may indicate that a FTM 806 is performed between the FTM responder 802 and the initiator 804. For example, FTM responder 1 802.1 may perform a 806.1 with the initiator 804. In some embodiments, one or more of the operations of the FTM 806 is performed simultaneously, e.g., using MU-MIMO. The FTM 806 may be one of the FTM methods disclosed herein (e.g., FIGS. 9, 10, (11, 16, 17, 18, and 19).

The initiator 804 may be trying to determine its location 805. The initiator 804 may be in an indoor environment. The initiator 804 may want to determine a three-dimensional (3D) location 805. The axes 808 illustrate that the location 805 of the initiator 804 and the locations 803 of the FTM responders may include an X, Y, and Z component. The initiator 804 may need to determine its location relative to three FTM responders 802 to determine location 805 with three dimensions (e.g., a floor, and x and y location on the floor).

Figure 9A:
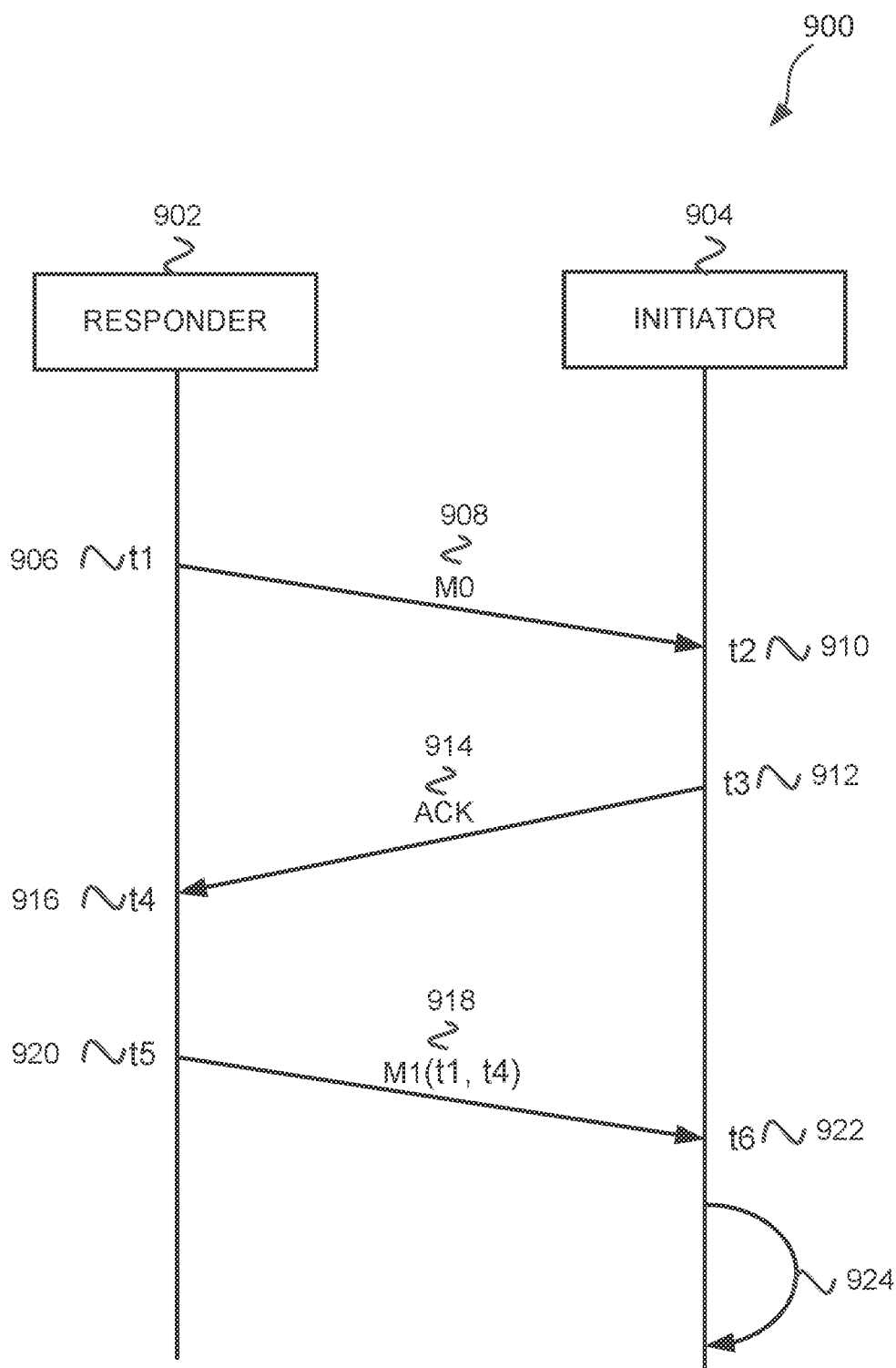
FIG. 9A illustrates a method of a fine timing measurement (FTM) in accordance with some embodiments.

FIG. 9A illustrates a method 900 of a fine timing measurement (FTM) in accordance with some embodiments. Illustrated in FIG. 9 is responder 902 and initiator 904. The responder 902 may be a HE AP 502 or a HE STA 504. The initiator 904 may be a HE AP 502 or a HE STA 504. The method 900 begins at time T1 906 with the responder 902 transmitting a message M0 908 to the initiator 904. The responder 902 may record time T1 906. The message M0 908 may be a FTM response. Prior to time T1 the initiator 904 may have transmitted a FTM request to the responder 902 and the responder 902 may have transmitted a FTM response, which may include FTM parameters for responder 902 and may indicate the responder 902 is ready to perform a FTM. The initiator 904 may receive the message M0 908 at time T2 910. The initiator 904 may record the time t2 910. In some embodiments, M0 908 may be a null data packet (NDP).

The method 900 continues at time T3 912 with the initiator 904 transmitting an acknowledgment (ACK) 914 to the responder 902. The ACK 914 may be received by the responder 902 at time T4 916. The initiator 904 may record the time T3 912. The responder 902 may record time t4 916.

The method 900 continues at time T5 920 with the responder 902 transmitting message M1 (T1,T4) 918. The message M1 918 comprises time t1 906 and time t4 916. The message M1 918 may be received at time t6 922 by the initiator 904.

The method 900 continues at operation 924 with the initiator 904 determining a distance from responder 902. The initiator 904 may determine the distance based on equation (1): round trip time (RTT)=(T4−T1)−(T3−T2). The initiator 904 may perform the FTM method 900 with one or more additional responders 902. In some embodiments, a location of the responder 902 may be included in one or more messages from responder 902, e.g., a FTP response (not illustrated) prior to M0 908, and/or M1 918. The initiator 904 may determine its location as a line, arc, or circle relative to the location of responder 902 based on being a determined distance from the responder 902. In some embodiments, a different sequence of operations may be performed that enable the initiator 904 to determine a round trip time for a message between the initiator 904 and the responder 902.

Figure 9B:
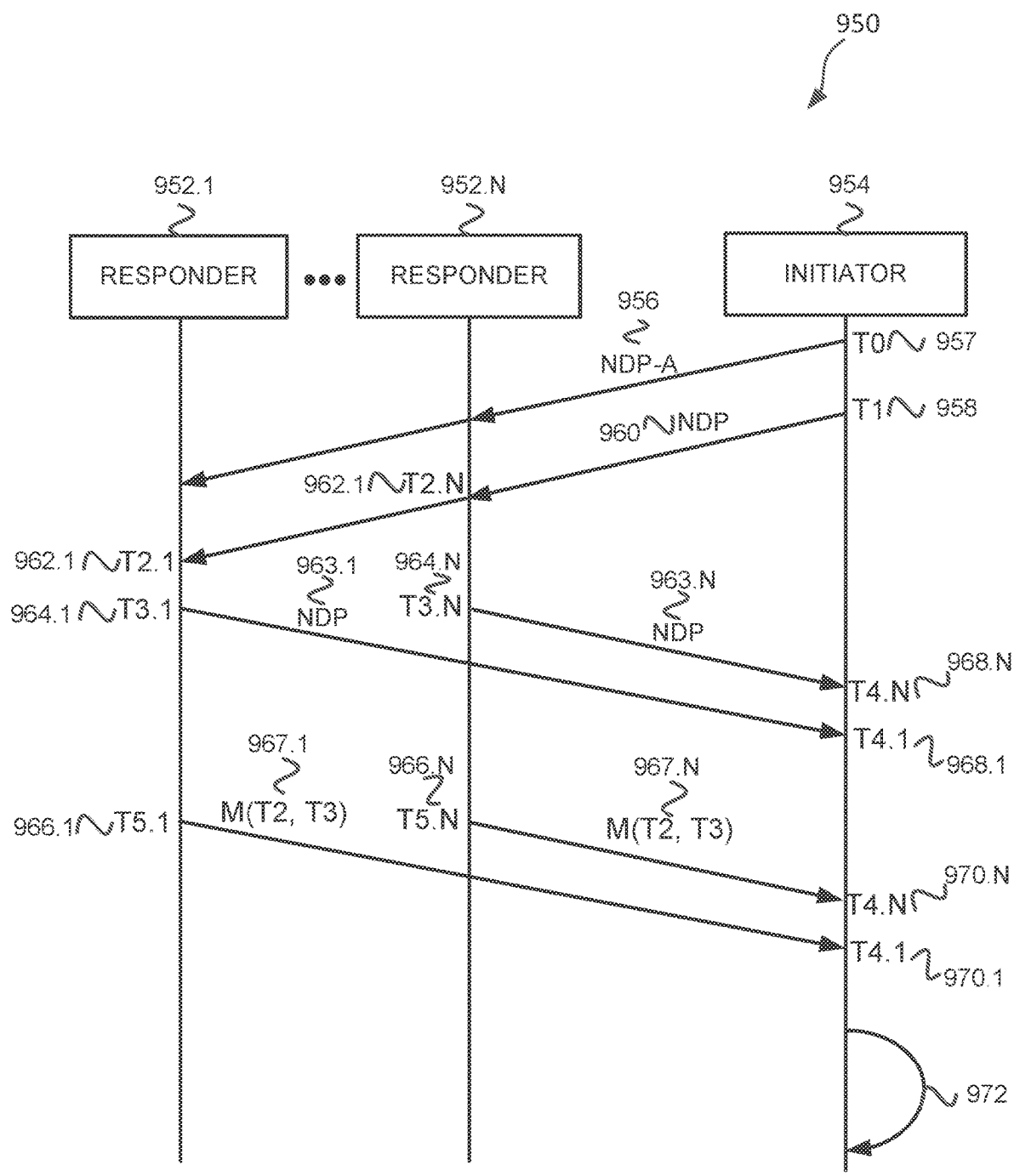
FIG. 9B illustrates a method of a FTM in accordance with some embodiments.

FIG. 9B illustrates a method 950 of a FTM in accordance with some embodiments. Illustrated in FIG. 9B are responders 952 and initiator 954. The responders 952 may be a HE AP 502 or a HE STA 504. A number of the responders 952 may be limited by a number of supported spatial streams supported by the responders 952 and/or initiator 954. The responders 952 may be configured to act as HE STAB 504 for participating in method 950, e.g., the responders 952 may be HE APs 502 that may temporarily not perform one or more functions of a HE AP 502 during method 950.

The initiator 954 may be a HE AP 502 or a HE STA 504. The method 950 begins at time T0 957 with the initiator 954 transmitting a null data packet announce (NDP-A) 956. The NDP-A 956 may include a schedule or resource allocations for the responders 952 to transmit the NDPs 963 and, in some embodiments, M(T2, T3) 967. The schedule or resource allocation, e.g., FTM initiate 1400 (see FIG. 14 and related discussion below) may be a NDP-A with resource allocation field 1402 being a resource allocation for NDPs 963 and a resource allocation. 1402 for M1 being a resource allocation for M(T2, T3) 967. In some embodiments, the resource allocation may be a spatial stream allocation for MU-MIMO communications. The NDP A 956 may indicate a resource allocation for the responders 952 to receive the NDP 960, e.g., each responder 952 may receive one or more NDPs 960 on a different spatial stream (or more than one spatial streams.) In some embodiments, the NDP-A 956 may be a downlink MU-MIMO where a preamble indicates a downlink MU-MIMO resource allocation for each of the responders 952.

The NDP-A 956 may indicate that a NDP 960 is going to be transmitted a certain time after T0 957. The method 950 may continue with the initiator 954 transmitting NDP 960 at time T1 958. The NDP 960 may be multiple NDPs 960 transmitted on different spatial streams. In some embodiments, the NDPs 960 may have a preamble that aids in determining direction by the receiver. This may aid in the responder 952 determining a line of sight between the responder 952 and the initiator 954. The NDP 960 may be a MU-MIMO downlink operation performed in accordance with resource allocations indicated in the NDP-A 956. In some embodiments, the initiator 954 is configured to operate as an access point (with at least some of the functionality of a HE AP 504) to perform method 950 (e.g., to transmit NDP-A 956), e.g., the initiator 954 may be configured to operate as a GO for at least a part of method 950.

The method 950 may continue with responders 952 (e.g., responder 952.1 through 952.N) transmitting NDPs 963 at times T3.1 964.1 through T3.N 964.N in accordance with a resource allocation of one or more spatial streams. The responders 952 may transmit the NDP 963 a fixed time after receiving the NDP 960. The resource allocation for transmitting the NDP 963 may be in the NDP-A 956 or another frame transmitted to the responders 952.

The method 950 continues with the initiator 954 receiving the NDPs 963 at times T4.1 968.1 through T4.N 968.N. The method 950 continues with the responders 952 at time 966 transmitting M(T2, T3) 967. M(T2, T3) 967 includes the time T2 962.1 and time T3 964.1 for a responder 952.1, for example M(T2, T3) 967 may be transmitting in accordance with uplink MU-MIMO where a spatial stream allocation for the responders 952 is sent in the NDP-A 956 or another frame (e.g., a frame transmitted after the initiator 954 receives NDPs 963.) In some embodiments, responders 952 receive one resource allocation of one or more spatial streams, and the responders 952 receive the NDP 960, transmit the NDP 963, and transmit the M(T2, T3) 967 all with the same spatial stream allocation. The method 950 or portions of the method 950 may be repeated.

The method 950 continues at operation 972 with the initiator 954 determining a distance from responders 952. The initiator 954 may determine the distance from responder 952.1 based on equation (1): RTT=(T2.$i$−T1)+(T4−T3.$i$). The initiator 954 may perform the FTM method 950 with one or more additional times. In some embodiments, a location of the responder 952 may be included in one or more messages from responder 952, e.g., M (T2, T3) or another message not illustrated. The initiator 954 may determine its location as a line, arc, or circle relative to the location of one responder 952 based on being a determined distance from the responder 952. In some embodiments, one or more messages may be exchanged between the responders 952 and the initiator 954 to determine capabilities and readiness (or willingness) to perform FTM (e.g., as disclosed in conjunction with FIG. 10). M(T2, T3) may be termed a reporting message in accordance with some embodiments. In some embodiments, one or more of the packets NDP-A 956, NDP 960, NDP 963, and M(T2, T3) 967 may include preambles that assist in the initiator 954 and/or responders 952 in determining the line-of-sight component of the received signal to better estimate the time of arrival of the packet.

Figure 10:
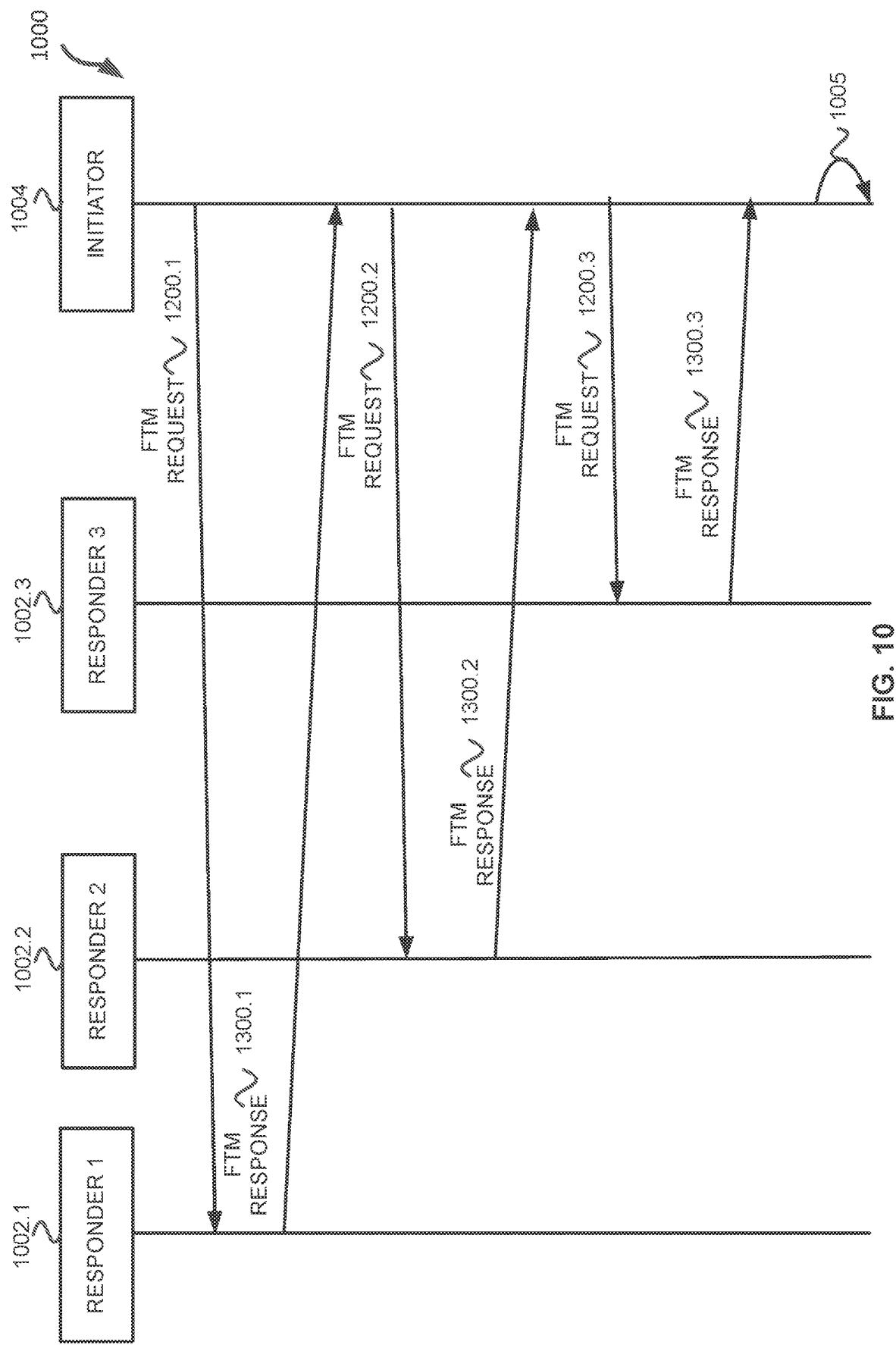
FIG. 10 illustrates a method of a FTM in accordance with some embodiments.

FIG. 10 illustrates a method 1000 of a FTM in accordance with some embodiments. Illustrated in FIG. 10 is responder 1 1002.1, responder 2 1002.2, responder 3 1002.3, and initiator 1004. Each of responder 1 1002.1, responder 2 1002.2, responder 3 1002.3, and initiator 1004 may be a HE STA 504 or HE AP 502.

The responders 1002 may be configured to act as HE STA 504 for participating in method 1000, e.g., the responders 952 may be HE APs 502 that may temporarily not perform one or more functions of a HE AP 502 during method 1000.

The method 1000 begins with initiator 1004 transmitting FTM request 1200.1 to responder 1 1002.1. The FTM request 1200.1 may be a request to perform FTM with responder 1 1002.1 and may include FTM capabilities 1202 as disclosed in conjunction with FIG. 12. In some embodiments, the initiator 1004 is configured to operate as an access point (e.g., with at least some of the functionality of a HE AP 504) to perform method 1000 (e.g., to transmit the FTM request 1200), e.g., the initiator 1004 may be configured to operate as a GO for at least a part of method 1000.

The method 1000 may continue with responder 1 1002.1 transmitting FTM response 1300.1. The FTM response 1300.1 may include FTM capabilities 1302 as disclosed in conjunction with FIG. 13. In some embodiments, FTM response 1300.1 may include ready 1304 which indicates whether the responder 1 1002.1 is ready to perform FTM with the initiator 1004.

The method 1000 may continue with the initiator transmitting FTM request 1200.2 to responder 2. The method 1000 continues with responder 2 1002.2 transmitting FTM response 1300.2 to initiator 1004. The method 1000 may continue with the initiator transmitting FTM request 1200.3 to responder 3 1002.3. The method 1000 continues with responder 3 1002.3 transmitting FTM response 1300.3 to initiator 1004. In some embodiments, the initiator 1004 may transmit a FTM request 1200.1 as a broadcast message which may solicit one or more FTM responses 1300 (e.g., the FTM request 1200.1 may include resource allocations for the responders 1002 to transmit their FTM responses 1300). In some embodiments, method 1000 may include fewer or more responders.

Figure 11:
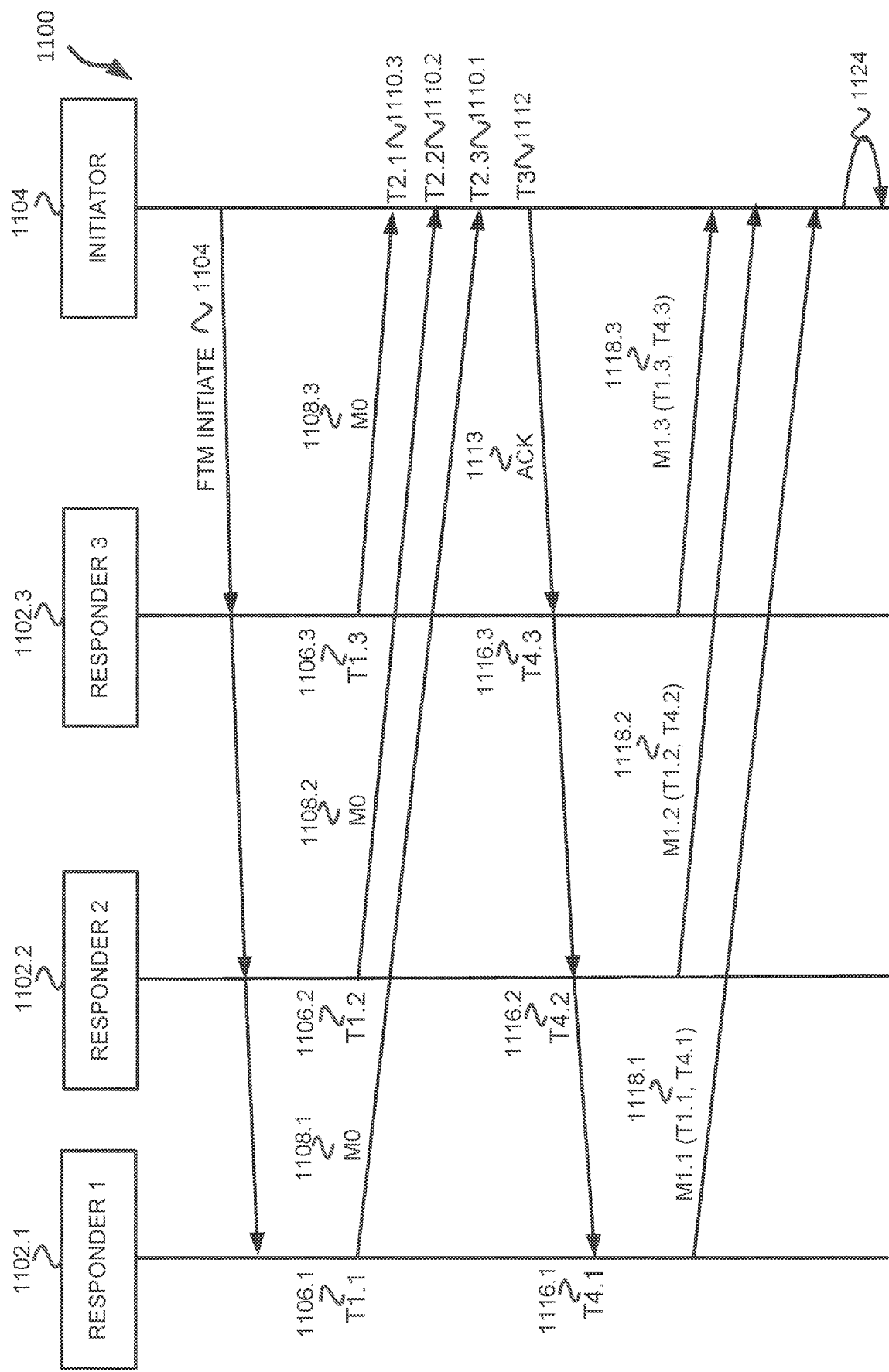
FIG. 11 illustrates a method of a FTM in accordance with some embodiments.

FIG. 11 illustrates a method 1100 of a FTM in accordance with some embodiments. Illustrated in FIG. 11 is responder 1 1102.1, responder 2 1102.2, responder 3 1102.3, and initiator 1104. The responder 1 1102.1, responder 2 1102.2, responder 3 1102.3, and initiator 1104 each may be a HE STA 504 or HE AP 502.

The responders 1102 may configured to act as HE STA 504 for participating in method 950, e.g., the responders 1102 may be FIE APs 502 that may temporarily not perform one or more functions of a HE AP 502 during method 1100.

Initiator 1104 may perform method 1000 prior to starting method 1100. Initiator 1104 may use method 1000 to find and/or determine the FTM capabilities 1302 and readiness (e.g., ready 1304) of responder 1 1102.1, responder 2 1102.2, and responder 3 1103.3.

The method 1100 may begin with the initiator 1104 transmitting FTM initiate 1400 to responder 1 1102.1, responder 2 1102.2, and responder 3 1102.3. In some embodiments, the FTM initiate 1104 indicates a resource allocation 1402 for responder 1 1102.1, responder 2 1102.2, and responder 3 1102.3. The resource allocation 1402 may indicate a resource allocation 1402 for each of the responders 1102 to transmit M0 1108 and, in some embodiments a resource allocation 1402 to transmit M1. The resource allocations 1402 may be a spatial stream indication for the responder 1102 to use to transmit M0 1108, and, in some embodiments, a spatial stream (which may be different than the spatial stream for M0) for the responders 1102 to transmit M1 1118. In some embodiments, the initiator 1104 is configured to operate as an access point (with at least some of the functionality of a HE AP 504) to perform method 1100 (e.g., to transmit FTM initiate 1104), e.g., the initiator 1104 may be configured to operate as a GO for at least a part of method 1100.

The method 1100 continues with the responders 1102 transmitting M0s 1108 in accordance with the resource allocation and in accordance with MU-MIMO. The responders 1102 storing time T1 1106. The initiator 1104 may receive the M0 1108 messages and store T2 1110 when the M0 1108 messages are received.

The method 1100 may continue with the initiator 1104 transmitting ACK 1113 to the responders 11102 to acknowledge the receipt of the M0 1108 messages. In some embodiments, the ACK 1113 may be one packet that acknowledges all three M0 1108 messages. In some embodiments, ACK 1113 may be the same or similar as ACK 1500. In some embodiments, the ACK 1113 may be separate frames transmitted on the resource allocation indicated in FTM initiate 1104, e.g. the initiator 1104 may transmit a separate ACK 1113 (e.g., ACK 1113.1, ACK 1113.2, and ACK 1113.3) to each of the responders 1102 on a different spatial stream. In some embodiments, the FTM initiate 1104 may include an indication of how the ACK 1113 will be transmitted. In some embodiments, the ACK 1113 may be transmitted in accordance with OFDMA on separate resource units to the responders 1102. In some embodiments, the ACK 1113 may be separate ACKs 1113 transmitted on different spatial streams to the responders 1102.

In some embodiments, the FTM initiate 1104, M0 1108, ACK 1113, and/or M1 1118 frames may include preambles that assist in the initiator 1104 in determining the line-of-sight component of the received signal to better estimate the time of arrival of T2 1110. For example, the M0 1108 frame may have multiple paths to the initiator 1104 as it may reflect off surfaces (e.g., walls in an indoor environment). The preamble may have signals that help identify a direction from with the signals where transmitted from.

The responders 1102 store the time T4 when the ACK 1113 is received at the responders 1102. The method 1100 continues with the responders 1102 transmitting M1 1118 to the initiator 1104. The responders 1102 may transmit M1 1118 in accordance with a resource allocation 1402 for M1 indicated in the FTM initiate 1104. In some embodiments, the responders 1102 transmit M1 1118 in accordance with MU-MIMO and a resource allocation (e.g., resource allocation 1402 for M1 or resource allocation M1 1504). M1 1118 include time T1 1106 and T4 1116.

The method 1100 may continue at operation 1124 with the initiator 1104 determining a location. For example, the initiator 1100 may determine the distance from each of the responders 1102 based on equation (1): round trip time (RTT)=(T4−T1)−(T3−T2). In some embodiments, the location 803 (FIG. 3) of the responders 1102 is sent to the initiator 1100 (e.g., in FTM response 1300, M0 1108, or M1). The initiator 1104 may use the distance from the responders 1102 and the responder 1102 location (e.g., 803) to triangulate a location 805 (FIG. 8) of the initiator 1104.

Figure 12:
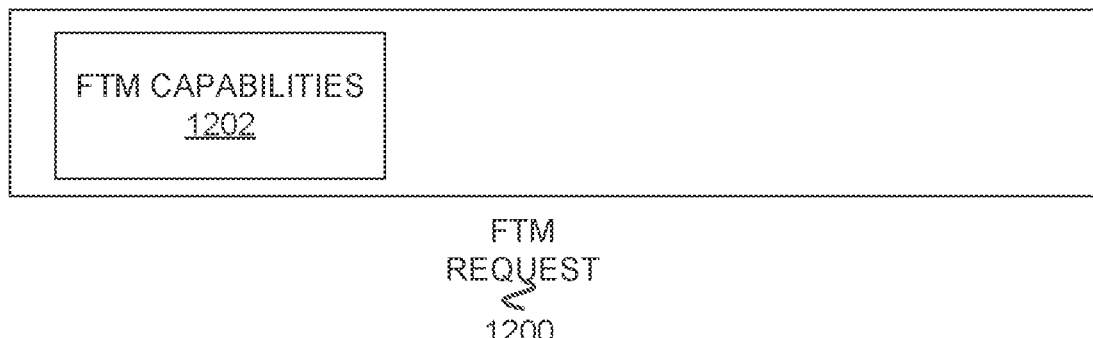
FIG. 12 illustrates a FTM request frame in accordance with some embodiments.

FIG. 12 illustrates a FTM request 1200 frame in accordance with some embodiments. The FTM request 1200 may include a FTM capabilities 1202 element which may include capabilities of the sender of the initiator. The FTM request 1200 may also include information to negotiate a FTM method with a responder, e.g., a proposal to use MU-MIMO.

Figure 13:
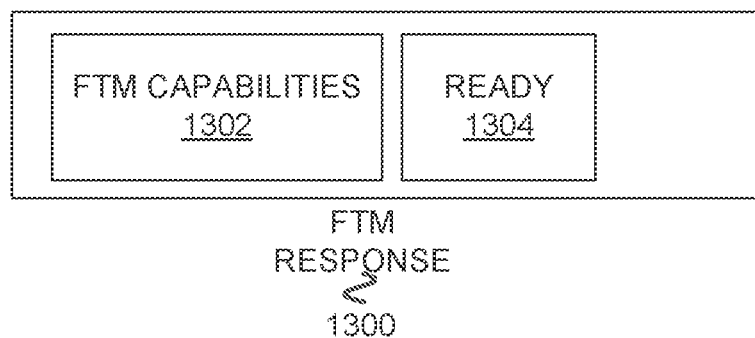
FIG. 13 illustrates a FTM response frame in accordance with some embodiments.

FIG. 13 illustrates a FTM response 1300 frame in accordance with some embodiments. The FTM response 1300 frame may include FTM capabilities 1302 and ready 1304. The FTM capabilities 1302 may indicate the capabilities of the responder. The ready 1304 field may indicate whether the responder is ready to perform an FTM method with the initiator.

Figure 14:
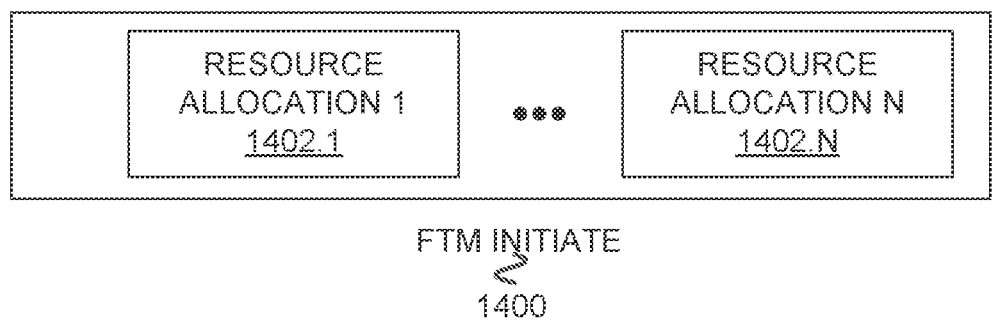
FIG. 14 illustrates FTM initiate in accordance with some embodiments.

FIG. 14 illustrates FTM initiate 1400 in accordance with some embodiments. FTM initiate 1400 may include one or more resource allocations 1402. For example, FTM initiate 1400 may include resource allocation 1 1402.1 through resource allocation N 1402.N. Resource allocation 1402.1 may be a resource allocation for a responder to transmit M0. Resource allocations 1402 may include an identification of the receiver (e.g., an association identification (AID) or MAC address of a HE STA 504 and/or HE AP 502), and an indication of one or more spatial streams for the receiver of the FTM initiate 1400 to use to receive and/or transmit frames. In some embodiments, a resource allocation 1402 may be for one of the following: responders 952 to receive NDPs 960; responders 952 to transmit NDPs 963; responders to transmit M(T2, T3); responders 1002 to transmit FTM responses 1300; responders 1102 to transmit M0 1108; responders 1102 to receive ACEs 1113; and/or, responders 1102 to transmit M1 1118.

In some embodiments, the FTM initiate 1400 may be the NDP-A 956 (FIG. 9B), the request 1200, the FTM initiate 1104, and/or the ACK 1113.

Figure 15:
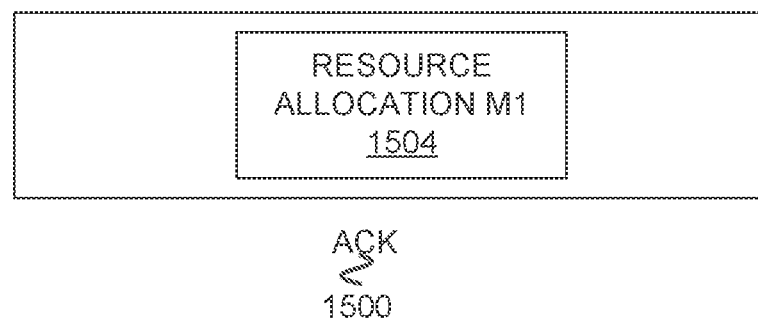
FIG. 15 illustrates an acknowledgement (ACK) frame.

FIG. 15 illustrates an acknowledgement (ACK) 1500 frame. The ACK 1500 flame may include a resource allocation M1 1504. Resource allocation M1 1504 may be a resource allocation for a responder to transmit M1, e.g., resource allocation M1 1504 may include a spatial stream and an identification of the responder (e.g., MAC address).

In some embodiments, one or more frames (e.g., FTM request 1200, FTM response 1300, FTM initiate 1400, M0 1108, M1 1118, and/or ACK 1114) may include preambles that assist in the initiator 1104 or responders 1102 in determining the line-of-sight component of the received signal to better estimate the time of arrival of the corresponding frame. For example, the preamble of the frame may have signals that help identify a direction from with the signals where transmitted from.

One or more of the resource allocations (e.g., resource allocation M1 1504, resource allocation 1 1402.1, resource allocation N 1402.N, resource allocations included in NDP-A 956, resource allocations included in FTM request 1200, resource allocation included in FTM initiate 1104, and/or resource allocations in ACK 1113 may include one or more of the following: an indication of a space-time stream for use with MU-MIMO, a space-time stream to be transmitted on a transmission bandwidth, a space-time stream to be transmitted on one or more channels, a subset of space-time streams, a bandwidth indicator for a number of space-time streams and an indication of which space-time streams, an indication that the space-time streams should be transmitted in a directional fashion, and/or an indication that the preamble of the packet includes signals to aid in determining a line-of-sight distance of the transmitter of the resource allocation. The resource allocations may be transmitted in a preamble portion (e.g., a HE-SIG field) or a MAC portion of the frame. The resource allocations may use preexisting group structures, e.g., the responders and initiator may already be part of groups for another purpose.

Figure 16:
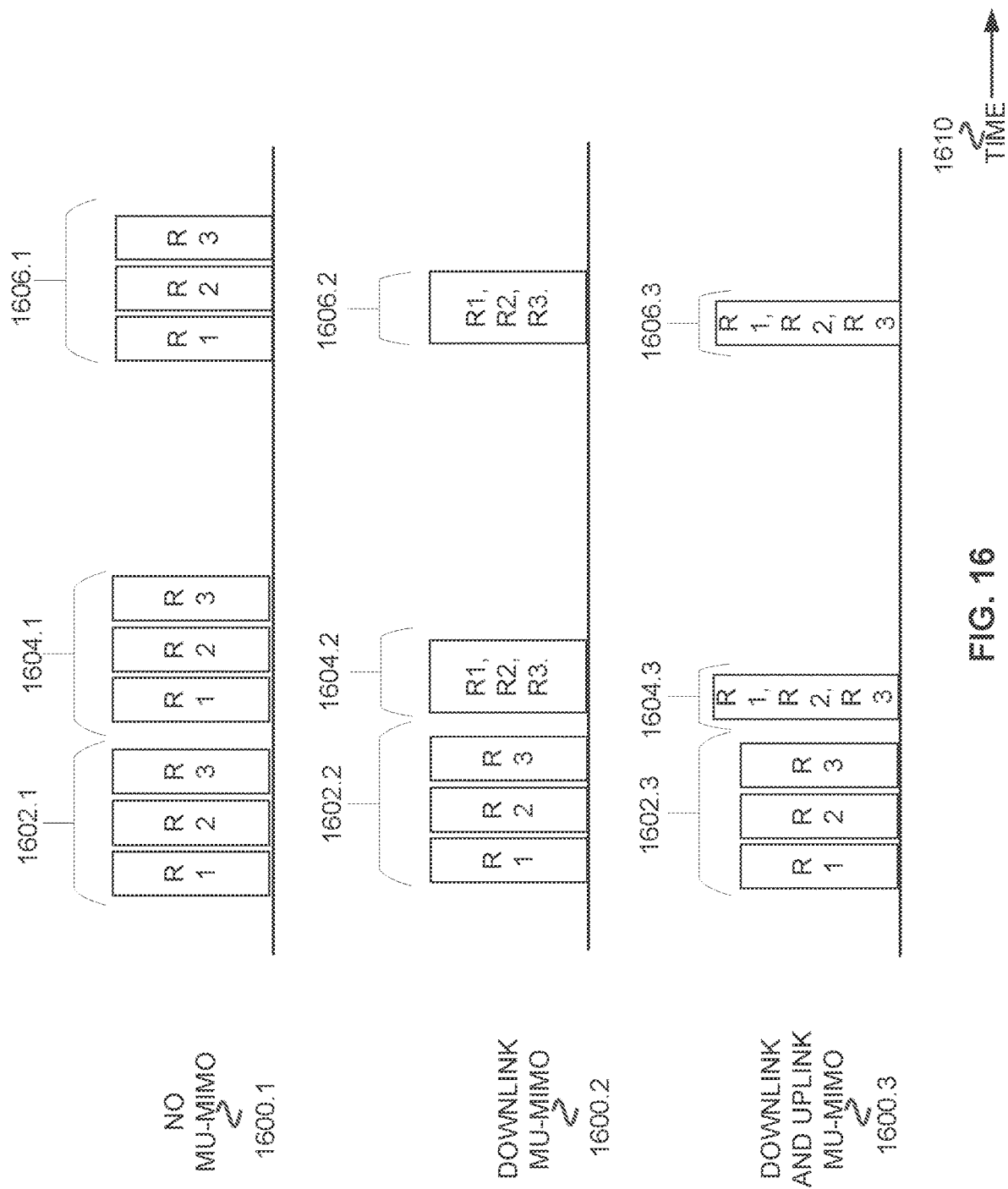
FIG. 16 illustrates the operation of a FTM method in accordance with some embodiments.

FIG. 16 illustrates the operation 1600 of a FTM method in accordance with some embodiments. Illustrated in FIG. 16 is the operation of a FTM method with no NU-MIMO 1600, downlink MU-MIMO 1600.2, and downlink and uplink MU-MIMO 1600.3. Each of the illustrations of the operation of the FTM method begins with operations 1602. Operations 1602 may be initialization operations where the initiator 1004 and the responders 1002 are serially negotiating or disclosing FTM capabilities 1202, 1302, and determining whether the responders 1002 are ready for a FTM method. In some embodiments, FIG. 10 is an example of the operations 1602 with responder 1 (R1) representing the time 1610 for initialization operations for responder 1 1202.1 (operations 1200.1 and 1300.1), R2 representing the time 1610 for initialization operations for responder 2 1202.2 (1200.2 and 1300.2), and R3 representing the time 1610 for initialization operations for responder 3 1202.3 (1200.3, 1300.3).

The operations 1604.1 and 1606.1 illustrate the time 1610 for a FTM method where the operations are performed serially (no MU-MIMO 1600.1). For example, operation 1604.1 may be FTM 900 where it is performed once for each of responder 1 1202.1 (R1), responder 2 1202.2 (R2), and responder 3 1202.3 (R3). Operations 1606 may be a repeat of the FTM method represented by 1604.

The operation 1604.2 and 1606.2 illustrate the time 1610 for a FTM method where the FTM operations are performed with downlink MU-MIMO 1600.2 (and uplink serially.) For example, operations 1604.2 and 1606.2 are illustrated by FTM initiate 1104 of FIG. 11 followed by the M0s 1108 being sent serially (as illustrated in FIG. 9A) to the initiator 1104, and then the ACK 1113 being sent in accordance with MU-MIMO.

The operations 1604 and 1606 illustrate the time 1610 for a FTM method where the FTM method operations are performed with downlink and uplink MU-MIMO 1600.3. For example, FIG. 11 illustrates where the downlink operations of the FTM method initiate 1400 and ACK 1113 are performed with downlink MU-MIMO (or with a single packet) and with uplink MU-MIMO operations with operation M0 1108 and M1 1118 where the responders 1102 transmit in parallel using MU-MIMO. As another example, referring to FIG. 9B, initiator 954 may transmit NDP 960 using downlink MU-MIMO, and the responders 952 may transmit NDP 963 and M(T2, T3) using uplink MU-MIMO. The NDP-A 956 may be a downlink MU-MIMO in accordance with some embodiments where a preamble indicates a downlink MU-MIMO resource allocation for each of the responders 952.

FIG. 16 illustrates that the amount of time 1610 for performing a FTM (e.g., FIGS. 9A, 9B, 10, 11, 17, 18, and 19) may be reduced by using MU-MIMO in one or both of the uplink and downlink portions.

Figure 17:
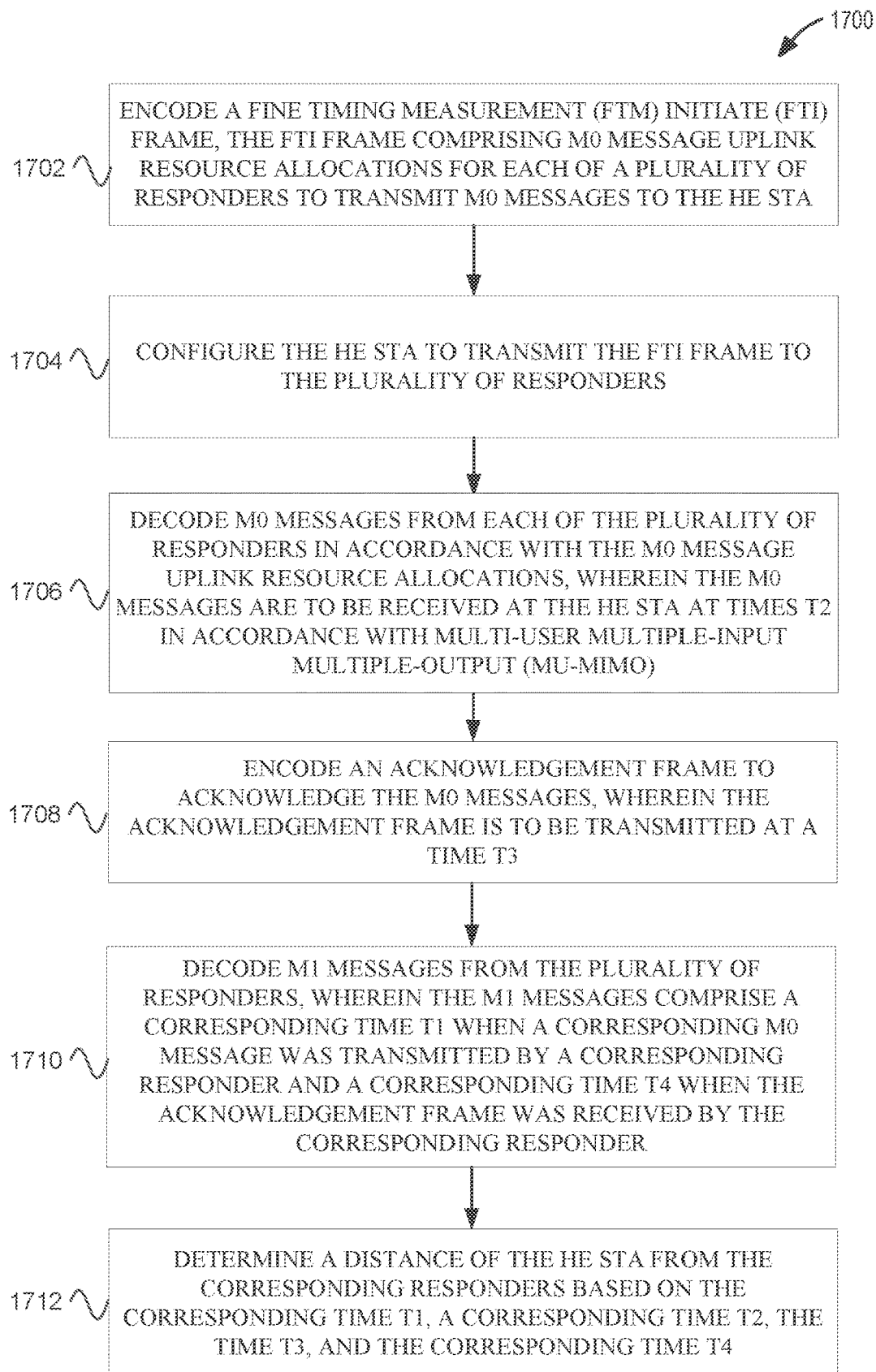
FIG. 17 illustrates a method of a FTM in accordance with some embodiments.

FIG. 17 illustrates a method 1700 of a FTM in accordance with some embodiments. The method 1700 begins at operation 1702 with encoding a FTM initiate frame, the FTM initiate frame comprising M0 message uplink resource allocations for each of a plurality of responders to transmit M0 messages to the HE STA.

For example, initiator 1104 (FIG. 11) may encode FTM initiate 1400 as described in conjunction with FIG. 11 and FIG. 14.

The method 1700 may continue at operation 1704 with configuring the HE STA to transmit the FTM initiate frame (FTI) frame to the plurality of responders. For example, the initiator 1104 may be a HE STA 504 or HE AP 502, and an apparatus of the HE STA 504 or HE AP 502 may configure the HE STA 504 or HE AP 502 to transmit the FTM initiate 1400.

The method 1700 continues at operation 1706 with decoding M0 messages from each of the plurality of responders in accordance with the M0 message uplink resource allocations, and wherein the M0 messages are to be received at the HE STA at times T2 in accordance with MU-MIMO.

The method 1700 continues at operation 1708 with encoding an acknowledgement frame to acknowledge the M0 messages, wherein the acknowledgement frame is to be transmitted at a time t3. For example, the initiator 1104 (or an apparatus of the initiator 1104) may encode ACK 1500 (FIG. 11) as disclosed in conjunction with FIGS. 11 and 15.

The method 1700 continues at operation 1710 with decoding M1 messages from of the plurality of responders, where of the M1 messages comprises a corresponding time t1 when a corresponding M0 message was to be transmitted by a corresponding responder and a corresponding time t4 when the acknowledgement frame was to be received by the corresponding responder.

For example, initiator 1104 may decode M1 messages 1118 that comprises the T1 and T4 for a corresponding responder 1102.

The method 1700 continues at operation 1712 with determining a distance of the HE STA from of the corresponding responders based on the corresponding time t1, a corresponding time t2, the time t3, and the corresponding time t4. For example, initiator 1104 at operation 1124 (FIG. 11) may determine a location of the initiator 1104 based on determining a distance from of the responders 1102 using t1, t2, t3, and t4 (e.g., see disclosure of FIG. 9).

In some embodiments, the operations of method 1700 may be carried out by an apparatus of a HE STA 504, an apparatus of a HE AP 502, a HE STA 504, and/or a HE AP 502. In some embodiments, one or more of the operations may be optional, and the operations may be in a different order.

Figure 18:
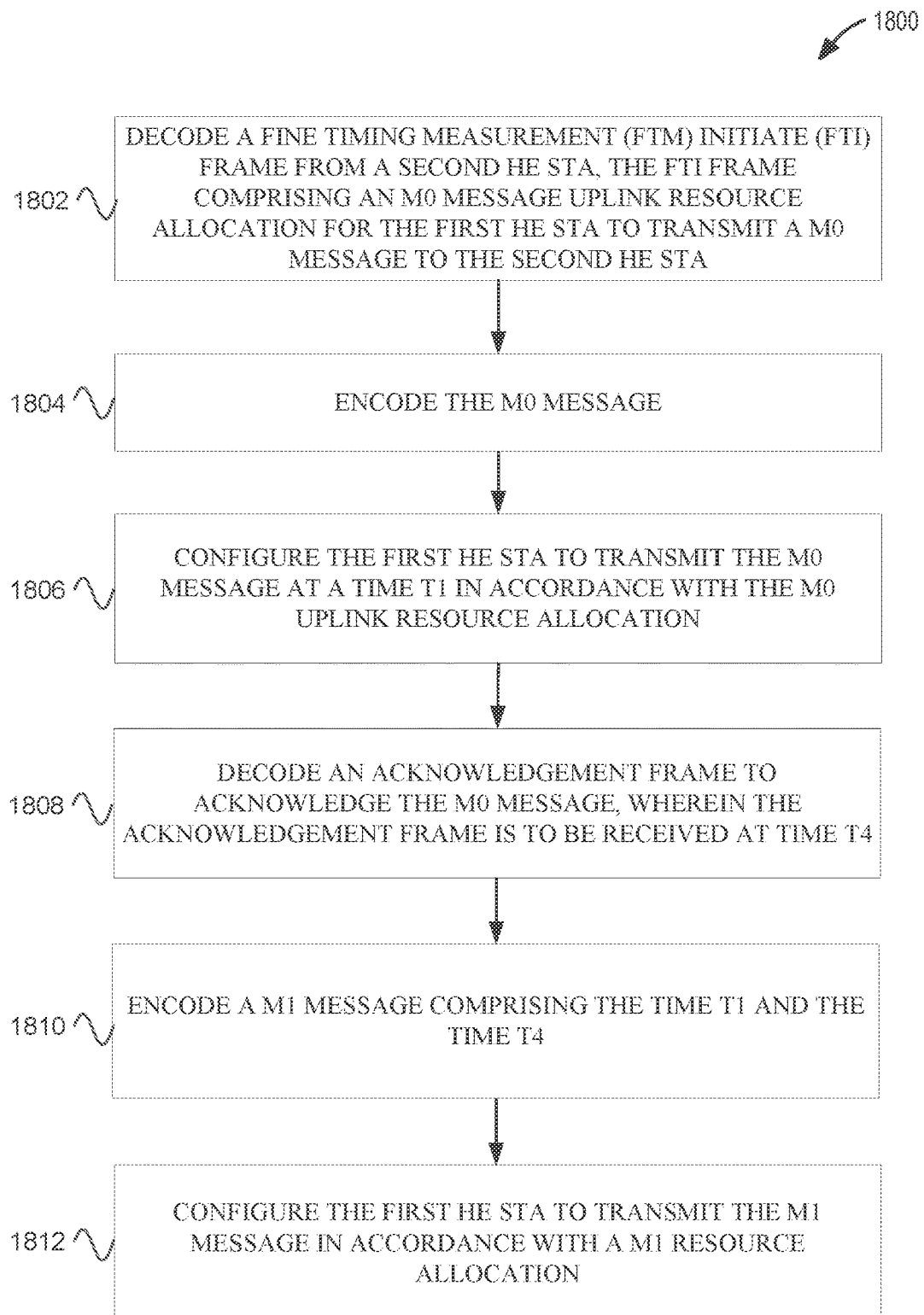
FIG. 18 illustrates a method of a FTM in accordance with some embodiments.

FIG. 18 illustrates a method 1800 of a FTM in accordance with some embodiments. The method 1800 begins at operation 1802 with decoding a FTM initiate (FTI) frame from a second HE STA, the FTI frame comprising an M0 message uplink resource allocation for the first HE STA to transmit a M0 message to the second HE STA. For example, responders 1102 may decode FTM initiate 1400 as disclosed in conjunction with FIGS. 11 and 14.

The method 1800 continues at operation 1804 with encoding the M0 message. For example, responders 1102 may encode message M0 1108 as disclosed in conjunction with FIG. 11.

The method 1800 continues at operation 1806 with configuring the first HE STA to transmit the M0 message at a time t1 in accordance with the M0 uplink resource allocation. For example, responders 1102 may transmit M0 1108 messages at time T1 1106 and transmit them in accordance with a resource allocation received in the FTM initiate 1400 frame.

The method 1800 may continue at operation 1808 with decoding an acknowledgement frame to acknowledge the M0 message, where the acknowledgement frame is to be received at time t4. For example, responders 1102 may decode ACK 1500 from initiator 1104 at time T4 1116.

The method 1800 may continue at operation 1810 with encoding a M1 message comprising the time t1 and the time t4. For example, responders 1102 may encode message M1 1118 comprising times T1 1106 and T4 1116.

The method 1800 may continue at operation 1812 with configuring the first HE STA to transmit the M1 message in accordance with a M1 resource allocation. For example, responders 1102 may transmit M1 1113, or an apparatus of the responders 1102 may transmit M1 1118.

In some embodiments, the operations of method 1300 may be carried out by an apparatus of a HE STA 504, an apparatus of a HE AP 502, a HE STA 504, and/or a HE AP 502. In some embodiments, one or more of the operations may be optional, and the operations may be in a different order.

Figure 19:
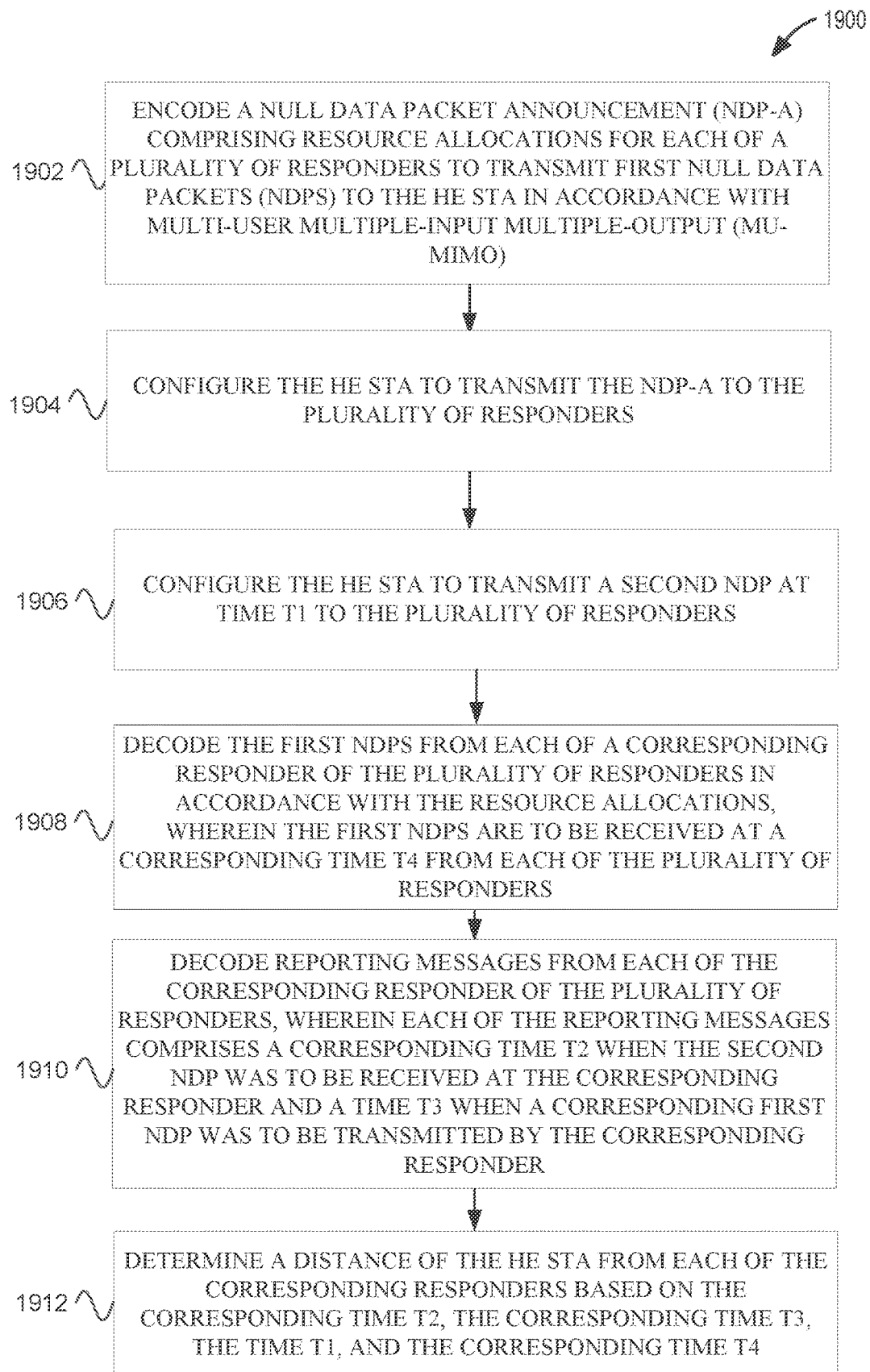
FIG. 19 illustrates a method of a FTM in accordance with some embodiments.

FIG. 19 illustrates a method 1900 of a FTM in accordance with some embodiments. The method 1900 may begin at operation 1902 with encoding a NDP-A comprising resource allocations for each of a plurality of responders to transmit first NDPs to the HE STA in accordance with MU-MIMO.

For example, initiator 956 may encode NDP-A 956 as described in conjunction with FIG. 9B, which may include resource allocation for each of the responders 952 to transmit NDPs 963.

The method 1900 may continue at operation 1904 with configuring the HE STA to transmit the NDP-A to the plurality of responders. For example, an apparatus of the initiator 954 may configure the initiator 954 to transmit the NDP-A 956.

The method 1900 may continue at operation 1906 with configuring the HE STA to transmit a second NDP at time T1 to the plurality of responders. For example, the initiator 954 may transmit NDP 960 to each of the responders 952.

The method 1900 may continue at operation 1908 with decoding the first NDPs from each of a corresponding responder of the plurality of responders in accordance with the resource allocations and MU-MIMO, wherein the first NDPs are to be received at a corresponding time T4 from each of the plurality of responders. For example, initiator 954 may decode NDPs 963 at times T4.

The method 1900 may continue at operation 1910 with decoding reporting messages from each of the corresponding responder of the plurality of responders, wherein each of the reporting messages comprises a corresponding time T2 when the second NDP was to be received at the corresponding responder and a time T3 when a corresponding first NDP was to be transmitted by the corresponding responder. For example, initiator 954 may decode M(172, T3) 967 from each of the responders 952 at times T4 970.

The method 1900 may continue at operation 1912 with determining a distance of the HE STA from each of the corresponding responders based on the corresponding time T2, the corresponding time T3, the time T1, and the corresponding time T4. For example, initiator 954 may determine a distance from each of the responders 952 (e.g., responder 952.I) based on T1 958, T2.I, T3.I, and T4.I.

In some embodiments, the operations of method 1900 may be carried out by an apparatus of a HE STA 504, an apparatus of a HE AP 502, a HE STA 504, and/or a HE AP 502. In some embodiments, one or more of the operations may be optional, and the operations may be in a different order.

The following provide further example embodiments. Example 1 is an apparatus of a high-efficiency (HE) station (STA) comprising: memory; and processing circuitry coupled to the memory, the processing circuitry configured to: encode a fine timing measurement (FTM) initiate (FTI) frame, the FTI frame comprising M0 message uplink resource allocations for each of a plurality of responders to transmit M0 messages to the HE STA; configure the HE STA to transmit the FTI frame to the plurality of responders; decode M0 messages from each of the plurality of responders in accordance with the M0 message uplink resource allocations, wherein the M0 messages are to be received at the HE STA at times T2 in accordance with multi-user multiple-input multiple-output (MU-MIMO); encode an acknowledgement frame to acknowledge the M0 messages, wherein the acknowledgement frame is to be transmitted at a time T3; decode M1 messages from the plurality of responders, wherein the M1 messages comprise a corresponding time T1 when a corresponding M0 message was transmitted by a corresponding responder and a corresponding time T4 when the acknowledgement frame was received by the corresponding responder; and determine a distance of the HE STA from the corresponding responders based on the corresponding time T1, a corresponding time T2 of the times T2, the time T3, and the corresponding time T4.

In Example 2, the subject matter of Example 1 optionally includes wherein the processing circuitry is further configured to: decode a location of each of the plurality of responders; and determine a location of the HE STA based on the distance of the HE STA from each of the corresponding responders and a corresponding location of the plurality of responders, wherein a number of the plurality of responders is at least three.

In Example 3, the subject matter of any one or more of Examples 1-2 optionally include messages comprises an allocation of a spatial stream for each of the plurality of responders to use in accordance with MU-MIMO.

In Example 4, the subject matter of Example 3 optionally includes messages. In Example 5, the subject matter of any one or more of Examples 1-4 optionally include messages.

In Example 6, the subject matter of any one or more of Examples 1-5 optionally include wherein the processing circuitry is further configured to: decode the M0 messages from each of the plurality of responders in accordance with multi-user multiple-input multiple-output (MU-MIMO) and in accordance with the M0 uplink resource allocations.

In Example 7, the subject matter of any one or more of Examples 1-6 optionally include wherein the processing circuitry is further configured to: for each of the plurality of responders, encode a FTM request frame, and decode a FTM response frame from each of the plurality of responders.

In Example 8, the subject matter of any one or more of Examples 1-7 optionally include wherein the processing circuitry is further configured to: decode the M1 messages from each of the plurality of responders in accordance with multi-user multiple-input multiple-output (MU-MIMO), wherein the M1 messages are non-orthogonal spatial streams.

In Example 9, the subject matter of any one or more of Examples 1-8 optionally include wherein the processing circuitry is further configured to: encode a preamble portion of the FTI frame to comprise a resource allocation for each of the plurality of responders to receive the FTM initiate frame; and configure the HE STA to transmit the FTM initiate frame in accordance with one or both of multi-user multiple-input multiple-output (MU-MIMO) and orthogonal frequency division multiple-access (OFDMA), and in accordance with the resource allocation for each of the plurality of responders.

In Example 10, the subject matter of any one or more of Examples 1-9 optionally include wherein the processing circuitry is further configured to: determine the distance of the HE STA from each of the corresponding responders based on: ((the corresponding time T4−the corresponding time T1)−(the time T3−the corresponding time T2))/2×a speed of light in free space.

In Example 11, the subject matter of any one or more of Examples 1-10 optionally include wherein the processing circuitry is further configured to: operate as an HE access point to transmit the FTI frame, wherein the FTM initiate frame is a trigger frame.

In Example 12, the subject matter of any one or more of Examples 1-11 optionally include access point. In Example 13, the subject matter of any one or more of Examples 1-12 optionally include transceiver circuitry; and, one or more antennas coupled to the transceiver circuitry.

Example 14 is a non-transitory computer-readable storage medium that stores instructions for execution by one or more processors, the instructions to configure the one or more processors to cause a high-efficiency (HE) station (STA) to: encode a null data packet announcement (NDP-A) comprising resource allocations for each of a plurality of responders to transmit first null data packets (NDPs) to the HE STA in accordance with multi-user multiple-input multiple-output (MU-MIMO); configure the HE STA to transmit the NDP-A to the plurality of responders; configure the HE STA to transmit a second NDP at time T1 to the plurality of responders; decode the first NDPs from each of a corresponding responder of the plurality of responders in accordance with the resource allocations, wherein the first NDPs are to be received at a corresponding time T4 from each of the plurality of responders; decode reporting messages from each of the corresponding responder of the plurality of responders, wherein each of the reporting messages comprises a corresponding time T2 when the second NDP was to be received at the corresponding responder and a time T3 when a corresponding first NDP was to be transmitted by the corresponding responder; and determine a distance of the HE STA from each of the corresponding responders based on the corresponding time T2, the corresponding time T3, the time T1, and the corresponding time T4.

In Example 15, the subject matter of Example 14 optionally includes wherein the NDP-A further comprises a resource allocation for each of the plurality of responders to receive the second NDP, and wherein the instructions further configure the one or more processors to cause the wireless HE STA to: configure the HE STA to transmit the second NDP to the plurality of responders in accordance with MU-MIMO and in accordance with the resource allocation for each of the plurality of responders to receive the second NDP.

In Example 16, the subject matter of any one or more of Examples 14-15 optionally include wherein the NDP-A further comprises a resource allocation for each of the plurality of responders to transmit the second reporting message, and wherein the instructions further configure the one or more processors to cause the wireless HE STA to: configure the HE STA to decode the reporting messages from each of the corresponding responder of the plurality of responders in accordance with MU-MIMO and the resource allocation for each of the plurality of responders to transmit the second reporting message.

In Example 17, the subject matter of any one or more of Examples 14-16 optionally include wherein the instructions further configure the one or more processors to cause the wireless HE STA to: determine a location of the HE STA based on the distances of the HE STA from each of the corresponding responders and a location of each of the corresponding responders.

Example 18 is a method performed by a high-efficiency (HE) station (STA), the method comprising: encoding a fine timing measurement (FTM) initiate (FTI) frame, the FTI frame comprising M0 message uplink resource allocations for each of a plurality of responders to transmit M0 messages to the HE STA; configuring the HE STA to transmit the FTI frame to the plurality of responders; decoding M0 messages from each of the plurality of responders, wherein the M0 messages are to be received at the HE STA at times T2; encoding an acknowledgement frame to acknowledge the M0 messages, wherein the acknowledgement frame is to be transmitted at a time T3; decoding M1 messages from each of the plurality of responders, wherein each of the M1 messages comprise a corresponding time T1 when a corresponding M0 message was to be transmitted by a corresponding responder and a corresponding time T4 when the acknowledgement frame was to be received by the corresponding responder; and determining a distance of the HE STA from each of the corresponding responders based on the corresponding time T1, a corresponding time T2 of the times T2, the time T3, and the corresponding time T4.

In Example 19, the subject matter of Example 18 optionally includes messages comprises an allocation of a spatial stream for each of the plurality of responders.

Example 20 is an apparatus of a first high-efficiency (HE) station (STA) comprising memory; and processing circuitry coupled to the memory, the processing circuitry configured to: decode a fine timing measurement (FTM) initiate (FTI) frame from a second HE STA, the FTI frame comprising an M0 message uplink resource allocation for the first HE STA to transmit a M0 message to the second HE STA; encode the M0 message; configure the first HE STA to transmit the M0 message at a time T1 in accordance with the M0 uplink resource allocation; decode an acknowledgement frame to acknowledge the M0 message, wherein the acknowledgement frame is to be received at time T4; encode a M1 message comprising the time T1 and the time T4; and configure the first HE STA to transmit the M1 message.

In Example 21, the subject matter of Example 20 optionally includes message uplink resource allocation comprises an allocation of a spatial stream, and wherein the processing circuitry is further configured to: configure the first HE STA to transmit the M0 message at the time t1 in accordance with the M0 message uplink resource allocation and in accordance with multi-user multiple-input multiple-output (MU-MIMO).

In Example 22, the subject matter of any one or more of Examples 20-21 optionally include wherein the processing circuitry is further configure to: configure the first HE STA to transmit the M1 message in accordance with a M1 resource allocation.

In Example 23, the subject matter of Example 22 optionally includes uplink resource allocation.

In Example 24, the subject matter of any one or more of Examples 20-23 optionally include access point.

In Example 25, the subject matter of any one or more of Examples 20-24 optionally include transceiver circuitry; and, one or more antennas coupled to the transceiver circuitry.

Example 26 is an apparatus of a high-efficiency (HE) station (STA) comprising: means for encoding a fine timing measurement (FTM) initiate frame, the FTM initiate frame comprising M0 uplink resource allocations for each of a plurality of responders to transmit M0 messages to the HE STA; means for configuring the HE STA to transmit the FTI frame to the plurality of responders; means for decoding M0 messages from each of the plurality of responders in accordance with the M0 uplink resource allocations, wherein the M0 messages are to be received at the HE STA at times T2 in accordance with multi-user multiple-input multiple-output (MU-MIMO); means for encoding an acknowledgement frame to acknowledge the M0 messages, wherein the acknowledgement frame is to be transmitted at a time T3; means for decoding M1 messages from the plurality of responders, wherein the M1 messages comprise a corresponding time T1 when a corresponding message M0 was transmitted by a corresponding responder and a corresponding time T4 when the acknowledgement frame was received by the corresponding responder; and means for determining a distance of the HE STA from the corresponding responders based on the corresponding time T1, a corresponding time T2 of the times T2, the time T3, and the corresponding time T4.

In Example 27, the subject matter of Example 26 optionally includes means for decoding a location of each of the plurality of responders; and means for determining a location of the HE STA based on the distance of the HE STA from each of the corresponding responders and a corresponding location of the plurality of responders, wherein a number of the plurality of responders is at least three.

In Example 28, the subject matter of any one or more of Examples 26-27 optionally include messages comprises an allocation of a spatial stream for each of the plurality of responders to use in accordance with MU-MIMO.

In Example 29, the subject matter of Example 28 optionally includes messages.

In Example 30, the subject matter of any one or more of Examples 26-29 optionally include messages.

In Example 31, the subject matter of any one or more of Examples 26-30 optionally include means for decoding the M0 messages from each of the plurality of responders in accordance with multi-user multiple-input multiple-output (MU-MIMO) and in accordance with the M0 uplink resource allocations.

In Example 32, the subject matter of any one or more of Examples 26-31 optionally include for each of the plurality of responders, means for encoding a FTM request frame, and decode a FTM response frame from each of the plurality of responders.

In Example 33, the subject matter of any one or more of Examples 26-32 optionally include means for decoding the M1 messages from each of the plurality of responders in accordance with multi-user multiple-input multiple-output (MU-MIMO), wherein the M1 messages are non-orthogonal spatial streams.

In Example 34, the subject matter of any one or more of Examples 26-33 optionally include means for encoding a preamble portion of the FTM initiate frame to comprise a resource allocation for each of the plurality of responders to receive the FTM initiate frame; and means for configuring the HE STA to transmit the FTM initiate frame in accordance with one or both of multi-user multiple-input multiple-output (MU-MIMO) and orthogonal frequency division multiple-access OFDMA), and in accordance with the resource allocation for each of the plurality of responders.

In Example 35, the subject matter of any one or more of Examples 26-34 optionally include means for determining the distance of the HE STA from each of the corresponding responders based on: ((the corresponding time T4−the corresponding time T1)−(the time T3−the corresponding time T2))/2× a speed of light in free space.

In Example 36, the subject matter of any one or more of Examples 26-35 optionally include means for operating as an HE access point to transmit the FTM initiate frame, wherein the FTM initiate frame is a trigger frame.

In Example 37, the subject matter of any one or more of Examples 26-36 optionally include means for processing radio frequency signals coupled to means for storing and retrieving data; and, means for transmitting and receiving radio frequency signals coupled to the means for processing radio frequency signals.

Example 38 is a non-transitory computer-readable storage medium that stores instructions for execution by one or more processors, the instructions to configure the one or more processors to cause a high-efficiency (HE) station (STA) to: decode a fine timing measurement (FTM) initiate (FTI) frame from a second HE STA, the FTI frame comprising an M0 message uplink resource allocation for the first RE STA to transmit a M0 message to the second HE STA; encode the M0 message; configure the first HE STA to transmit the M0 message at a time T1 in accordance with the M0 uplink resource allocation; decode an acknowledgement frame to acknowledge the M0 message, wherein the acknowledgement frame is to be received at time T4; encode a M1 message comprising the time T1 and the time T4; and configure the first HE STA to transmit the M1 message.

In Example 39, the subject matter of Example 38 optionally includes wherein the instructions further configure the one or more processors to cause the wireless HE STA to: configure the first HE STA to transmit the M0 message at the time t1 in accordance with the M0 uplink resource allocation and in accordance with multi-user multiple-input multiple-output (MU-MIMO).

In Example 40, the subject matter of any one or more of Examples 38-39 optionally include wherein the instructions further configure the one or more processors to cause the wireless HE STA to: configure the first HE STA to transmit the M1 message in accordance with a M1 resource allocation.

In Example 41, the subject matter of any one or more of Examples 38-40 optionally include uplink resource allocation.

In Example 42, the subject matter of any one or more of Examples 38-41 optionally include access point.

Example 43 is a method performed by a high-efficiency (HE) station (STA), the method comprising: decoding a fine timing measurement (FTM) initiate (FTI) frame from a second HE STA, the FTI frame comprising an M0 message uplink resource allocation for the first HE STA to transmit a M0 message to the second HE STA; encoding the M0 message; configuring the first HE STA to transmit the M0 message at a time T1 in accordance with the M0 uplink resource allocation; decoding an acknowledgement frame to acknowledge the M0 message, wherein the acknowledgement frame is to be received at time T4; encoding a M1 message comprising the time T1 and the time 14; and configuring the first HE STA to transmit the M1 message.

In Example 44, the subject matter of Example 43 optionally includes the method further comprising: configuring the first HE STA to transmit the M0 message at the time t1 in accordance with the M0 uplink resource allocation and in accordance with multi-user multiple-input multiple-output (MU-MIMO).

In Example 45, the subject matter of any one or more of Examples 43-44 optionally include the method further comprising: configuring the first HE STA to transmit the M1 message in accordance with a M1 resource allocation.

In Example 46, the subject matter of any one or more of Examples 43-45 optionally include uplink resource allocation. In Example 47, the subject matter of any one or more of Examples 43-46 optionally include access point.

Example 48 is an apparatus of a high-efficiency (HE) station (STA), the apparatus comprising: means for decoding a fine timing measurement (FTM) initiate frame from a second HE STA, the FTM initiate frame comprising an M0 uplink resource allocation for the first HE STA to transmit a M0 message to the second HE STA; means for encoding the M0 message; means for configuring the first HE STA to transmit the M0 message at a time T1 in accordance with the M0 uplink resource allocation; means for decoding an acknowledgement frame to acknowledge the M0 message, wherein the acknowledgement frame is to be received at time T4; means for encoding a M1 message comprising the time T1 and the time 14; and means for configuring the first HE STA to transmit the M1 message.

In Example 49, the subject matter of Example 48 optionally includes means for configuring the first HE STA to transmit the M0 message at the time t1 in accordance with the M0 uplink resource allocation and in accordance with multi-user multiple-input multiple-output (MU-MIMO).

In Example 50, the subject matter of any one or more of Examples 48-49 optionally include means for configuring the first HE STA to transmit the M1 message in accordance with a M1 resource allocation.

In Example 51, the subject matter of any one or more of Examples 48-50 optionally include uplink resource allocation. In Example 52, the subject matter of any one or more of Examples 48-51 optionally include access point.

Example 53 is an apparatus of a high-efficiency (HE) station (STA) comprising: memory; and processing circuitry coupled to the memory, the processing circuitry configured to: encode a null data packet announcement (NDP-A) comprising resource allocations for each of a plurality of responders to transmit first null data packets (NDPs) to the HE STA in accordance with multi-user multiple-input multiple-output (MU-MIMO); configure the HE STA to transmit the NDP-A to the plurality of responders; configure the HE STA to transmit a second NDP at time T1 to the plurality of responders; decode the first NDPs from each of a corresponding responder of the plurality of responders in accordance with the resource allocations, wherein the first NDPs are to be received at a corresponding time T4 from each of the plurality of responders; decode reporting messages from each of the corresponding responder of the plurality of responders, wherein each of the reporting messages comprises a corresponding time T2 when the second NDP was to be received at the corresponding responder and a time T3 when a corresponding first NDP was to be transmitted by the corresponding responder; and determine a distance of the HE STA from each of the corresponding responders based on the corresponding time T2, the corresponding time T3, the time T1, and the corresponding time T4.

In Example 54, the subject matter of Example 53 optionally includes wherein the NDP-A further comprises a resource allocation for each of the plurality of responders to receive the second NDP, and wherein the processing circuitry is further configured to: configure the HE STA to transmit the second NDP to the plurality of responders in accordance with MU-MIMO and in accordance with the resource allocation for each of the plurality of responders to receive the second NDP.

In Example 55, the subject matter of any one or more of Examples 53-54 optionally include wherein the NDP-A further comprises a resource allocation for each of the plurality of responders to transmit the second reporting message, and wherein the processing circuitry is further configured to: configure the HE STA to decode the reporting messages from each of the corresponding responder of the plurality of responders in accordance with MU-MIMO and the resource allocation for each of the plurality of responders to transmit the second reporting message.

In Example 56, the subject matter of any one or more of Examples 53-55 optionally include and wherein the processing circuitry is further configured to: determine a location of the HE STA based on the distances of the HE STA from each of the corresponding responders and a location of each of the corresponding responders.

Example 57 is a method performed by a high-efficiency (HE) station (STA), the method comprising: encoding a null data packet announcement (NDP-A) comprising resource allocations for each of a plurality of responders to transmit first null data packets (NDPs) to the HE STA in accordance with multi-user multiple-input multiple-output (MU-MIMO; configuring the HE STA to transmit the NDP-A to the plurality of responders; configuring the HE STA to transmit a second NDP at time T1 to the plurality of responders; decoding the first NDPs from each of a corresponding responder of the plurality of responders in accordance with the resource allocations, wherein the first NDPs are to be received at a corresponding time T4 from each of the plurality of responders; decoding reporting messages from each of the corresponding responder of the plurality of responders, wherein each of the reporting messages comprises a corresponding time T2 when the second NDP was to be received at the corresponding responder and a time T3 when a corresponding first NDP was to be transmitted by the corresponding responder; and determining a distance of the HE STA from each of the corresponding responders based on the corresponding time T2, the corresponding time T3, the time T1, and the corresponding time T4.

In Example 58, the subject matter of Example 57 optionally includes wherein the NDP-A further comprises a resource allocation for each of the plurality of responders to receive the second NDP, and the method further comprising: configuring the HE STA to transmit the second NDP to the plurality of responders in accordance with MU-MIMO and in accordance with the resource allocation for each of the plurality of responders to receive the second NDP.

In Example 59, the subject matter of any one or more of Examples 57-58 optionally include wherein the NDP-A further comprises a resource allocation for each of the plurality of responders to transmit the second reporting message, and wherein the method further comprises: configuring the HE STA to decode the reporting messages from each of the corresponding responder of the plurality of responders in accordance with MU-MIMO and the resource allocation for each of the plurality of responders to transmit the second reporting message.

In Example 60, the subject matter of any one or more of Examples 57-59 optionally include the method further comprising: determining a location of the HE STA based on the distances of the HE STA from each of the corresponding responders and a location of each of the corresponding responders.

Example 61 is an apparatus of a high-efficiency (HE) station (STA), the apparatus comprising: means for encoding a null data packet announcement (NDP-A) comprising resource allocations for each of a plurality of responders to transmit first null data packets (NDPs) to the HE STA in accordance with multi-user multiple-input multiple-output (MU-MIMO); means for configuring the HE STA to transmit the NDP-A to the plurality of responders; means for configuring the HE STA to transmit a second NDP at time T1 to the plurality of responders; means for decoding the first NDPs from each of a corresponding responder of the plurality of responders in accordance with the resource allocations, wherein the first NDPs are to be received at a corresponding time T4 from each of the plurality of responders; means for decoding reporting messages from each of the corresponding responder of the plurality of responders, wherein each of the reporting messages comprises corresponding time T2 when the second NDP was to be received at the corresponding responder and a time T3 when a corresponding first NDP was to be transmitted by the corresponding responder; and means for determining a distance of the HE STA from each of the corresponding responders based on the corresponding time T2, the corresponding time T3, the time T1, and the corresponding time T4.

In Example 62, the subject matter of Example 61 optionally includes wherein the NDP-A further comprises a resource allocation for each of the plurality of responders to receive the second NDP, and the apparatus further comprising: means for configuring the HE STA to transmit the second NDP to the plurality of responders in accordance with MU-MIMO and in accordance with the resource allocation for each of the plurality of responders to receive the second NDP.

In Example 63, the subject matter of Example 62 optionally includes wherein the NDP-A further comprises a resource allocation for each of the plurality of responders to transmit the second reporting message, and wherein the apparatus further comprises: means for configuring the HE STA to decode the reporting messages from each of the corresponding responder of the plurality of responders in accordance with MU-MIMO and the resource allocation for each of the plurality of responders to transmit the second reporting message.

In Example 64, the subject matter of Example 63 optionally includes the apparatus further comprising: means for determining a location of the HE STA based on the distances of the HE STA from each of the corresponding responders and a location of each of the corresponding responders.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. An apparatus of a responding station (STA) comprising: memory; and processing circuitry coupled to the memory, the processing circuitry configured to:
encode a fine timing measurement (FTM) initiate (FTI) frame, the FTI frame comprising M0 message uplink resource allocations for each of a plurality of initiator STAs to transmit M0 messages to the responding STA, wherein the FTI frame is a trigger frame, wherein the M0 messages are null data packets;
configure the responding STA to transmit the FTI frame to the plurality of initiator STAs;
decode M0 messages from each of the plurality of initiator STAs in accordance with the M0 message uplink resource allocations, wherein the M0 messages are received at the responding STA at times T2 in accordance with multi-user multiple-input multiple-output (MU-MIMO);

encode frames for transmission after the M0 messages, wherein the frames are to be transmitted at a time T3;

decode M1 messages from the plurality of initiator STAs, wherein the M1 messages comprise a corresponding time T1 when a corresponding M0 message was transmitted by a corresponding initiator STA of the plurality of initiator STAs and a corresponding time T4 when a corresponding frame of the frames was received by the corresponding initiator STA; and determine a distance of the responding STA from each of the corresponding initiator STAs based on ((the corresponding time T4–the time T3)–(the corresponding time T2–a corresponding time T1))/(2 times a speed of light in free space).

2. The apparatus of claim 1, wherein the processing circuitry is further configured to:

decode a location of each of the plurality of initiator STAs; and determine a location of the responding STA based on the distance of the responding STA from each of the corresponding initiator STAs and a corresponding location of the plurality of initiator STAs, wherein a number of the plurality of initiator STAs is at least three.

3. The apparatus of claim 1, wherein the M0 message uplink resource allocation for each of the plurality of responders to transmit the M0 messages comprises an allocation of a spatial stream for each of the plurality of initiator STAs to use in accordance with MU-MIMO.

4. The apparatus of claim 3, wherein the FTI frame further comprises an uplink resource allocation for each of the plurality of responders to transmit the M1 messages.

5. The apparatus of claim 1, wherein the acknowledgement frame comprises an uplink resource allocation for each of the plurality of responders to transmit the M1 messages.

6. The apparatus of claim 1, wherein the processing circuitry is further configured to:

decode the M0 messages from each of the plurality of responders in accordance with multi-user multiple-input multiple-output (MU-MIMO) and in accordance with the M0 uplink resource allocations.

7. The apparatus of claim 1, wherein the processing circuitry is further configured to:

for each of the plurality of initiator STAs, encode a FTM request frame, and decode a FTM response frame from each of the plurality of initiator STAs.

8. The apparatus of claim 1, wherein the processing circuitry is further configured to:

decode the M1 messages from each of the plurality of initiator STAs in accordance with multi-user multiple-input multiple-output (MU-MIMO), wherein the M1 messages are non-orthogonal spatial streams.

9. The apparatus of claim 1, wherein the processing circuitry is further configured to:

encode a preamble portion of the FTI frame to comprise a resource allocation for each of the plurality of initiator STAs to receive the FTM initiate frame; and configure the HE STA to transmit the FTM initiate frame in accordance with one or both of multi-user multiple-input multiple-output (MU-MIMO) and orthogonal frequency division multiple-access (OFDMA), and in accordance with the resource allocation for each of the plurality of initiator STAs.

10. The apparatus of claim 1, wherein the processing circuitry is further configured to:

operate as an access point to transmit the FTI frame.

11. The apparatus of claim 1, wherein the responding STA and each of the plurality of initiator STAs is one from the following group: an Institute of Electrical and Electronic Engineers (IEEE) 802.11ax access point, an IEEE 802.11ax station, an IEEE 802.11 station, and an IEEE 802.11 access point.

12. The apparatus of claim 1, further comprising transceiver circuitry; and, one or more antennas coupled to the transceiver circuitry.

13. A non-transitory computer-readable storage medium that stores instructions for execution by one or more processors of a responding station (STA), the instructions to configure the one or more processors to:

encode a null data packet announcement (NDP-A) comprising resource allocations for each of a plurality of initiator STAs to transmit first null data packets (NDPs) to the responding STA in accordance with multi-user multiple-input multiple-output (MU-MIMO);

configure the responding STA to transmit the NDP-A to the plurality of initiator STAs;

decode the first NDPs from each of a corresponding initiator STA of the plurality of initiator STAs in accordance with the resource allocations, wherein the first NDPs are to be received at a corresponding time T4 from each of the plurality of responders;

configure the responding STA to transmit second NDPs at time T1 to the plurality of initiator STAs;

decode reporting messages from each of the corresponding initiator STA of the plurality of initiator STAs, wherein each of the reporting messages comprises a corresponding time T2 when a corresponding second NDP was to be received at the corresponding initiator STA responder and a time T3 when a corresponding first NDP was to be transmitted by the corresponding initiator STA; and determine a distance of the responding STA from each of the corresponding initiator STAs based on ((the corresponding time T4–the time T3)–(the corresponding time T2–a corresponding time T1))/(2 times a speed of light in free space).

14. The non-transitory computer-readable storage medium of claim 13, wherein the NDP-A further comprises a resource allocation for each of the plurality of initiators to receive the second NDP, and wherein the instructions further configure the one or more processors to cause the responding STA to: configure the responding STA to transmit the second NDP to the plurality of initiator STAs in accordance with MU-MIMO and in accordance with the resource allocation for each of the plurality of initiator STAs to receive the second NDP.

15. The non-transitory computer-readable storage medium of claim 13, wherein the NDP-A further comprises a resource allocation for each of the plurality of initiator STAs to transmit the second reporting message, and wherein the instructions further configure the one or more processors to cause the responding STA to: configure the responding STA to decode the reporting messages from each of the corresponding initiator STA of the plurality of initiator STAs in accordance with MU-MIMO and the resource allocation for each of the plurality of initiator STAs to transmit the second reporting message.

16. The non-transitory computer-readable storage medium of claim 13, wherein the instructions further configure the one or more processors to cause the wireless responding STA to: determine a location of the responding STA based on the distances of the responding STA from each of the corresponding initiator STAs and a location of each of the corresponding initiator STAs.

17. A method performed by a responding station (STA), the method comprising:
encoding a fine timing measurement (FTM) initiate (FTI) frame, the FTI frame comprising M0 message uplink resource allocations for each of a plurality of initiator STAs to transmit M0 messages to the responding STA, wherein the FTI frame is a trigger frame;
configuring the responding STA to transmit the FTI frame to the plurality of initiator STAs;
decoding M0 messages from each of the plurality of initiator STAs in accordance with the M0 message uplink resource allocations, wherein the M0 messages are to be received at the responding STA at times T2 in accordance with multi-user multiple-input multiple-output (MU-MIMO);
encoding frames for transmission after the M0 messages, wherein the frames are to be transmitted at a time T3;
decoding M1 messages from the plurality of initiator STAs, wherein the M1 messages comprise a corresponding time T1 when a corresponding M0 message was transmitted by a corresponding initiator STA of the plurality of initiator STAs and a corresponding time T4 when a corresponding frame of the frames was received by the corresponding initiator STA; and
determining a distance of the responding STA from each of the corresponding initiator STAs based on ((the corresponding time T4−the time T3)−(the corresponding time T2−a corresponding time T1))/(2 times a speed of light in free space).

18. The method of claim 17, wherein the M0 message uplink resource allocation for each of the plurality of responders to transmit the M0 messages comprises an allocation of a spatial stream for each of the plurality of initiator STAs.

19. An apparatus of a first station (STA) comprising memory; and processing circuitry coupled to the memory, the processing circuitry configured to:
decode a fine timing measurement (FTM) initiate (FTI) frame from a second STA, the FTI frame comprising an M0 message uplink resource allocation for the first STA to transmit a M0 message to the second STA;
encode the M0 message, wherein the M0 message is a null data packet;
configure the first STA to transmit the M0 message at a time T1 in accordance with the M0 uplink resource allocation;
decode a frame to acknowledge the M0 message, wherein the frame is received at time T4;
encode a M1 message comprising the time T1 and the time T4; and
configure the first STA to transmit the M1 message;
decode a message comprising a time T2 when the M0 message was received at the second STA and a time T3 when the frame was transmitted by the second STA; and
determine a distance of the first STA from the second STA based on ((the time T2−the time T1)−(the time T4−the time T3))/(2 times a speed of light in free space).

20. The apparatus of claim 19, wherein the M0 message uplink resource allocation comprises an allocation of a spatial stream, and wherein the processing circuitry is further configured to:
configure the first STA to transmit the M0 message at the time t1 in accordance with the M0 message uplink resource allocation and in accordance with multi-user multiple-input multiple-output (MU-MIMO).

21. The apparatus of claim 19, wherein the processing circuitry is further configure to:
configure the first STA to transmit the M1 message in accordance with a M1 resource allocation.

22. The apparatus of claim 21, wherein the frame comprises the M1 uplink resource allocation, or the FTI frame comprises the M1 uplink resource allocation.

23. The apparatus of claim 19, wherein the first STA and the second STA are each one from the following group: an Institute of Electrical and Electronic Engineers (IEEE) 802.11ax access point, an IEEE 802.11ax station, an IEEE 802.11 station, and an IEEE 802.11 access point.

24. The apparatus of claim 19, further comprising transceiver circuitry; and, one or more antennas coupled to the transceiver circuitry.

* * * * *